United States Patent
Kwon

(10) Patent No.: US 12,236,336 B2
(45) Date of Patent: Feb. 25, 2025

(54) METHOD AND APPARATUS WITH DEEP LEARNING OPERATIONS

(71) Applicant: Samsung Electronics Co., Ltd., Suwon-si (KR)

(72) Inventor: Hyung-Dal Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 985 days.

(21) Appl. No.: 17/168,457

(22) Filed: Feb. 5, 2021

(65) Prior Publication Data

US 2022/0036165 A1 Feb. 3, 2022

(30) Foreign Application Priority Data

Jul. 31, 2020 (KR) ........................ 10-2020-0096333

(51) Int. Cl.
- *G06N 3/063* (2023.01)
- *G06F 7/544* (2006.01)
- *G06F 9/38* (2018.01)

(52) U.S. Cl.
CPC ........... *G06N 3/063* (2013.01); *G06F 7/5443* (2013.01); *G06F 9/3887* (2013.01)

(58) Field of Classification Search
CPC .............................. G06F 7/5443; G06F 9/3887
See application file for complete search history.

(56) References Cited

U.S. PATENT DOCUMENTS

| | | | |
|---|---|---|---|
| 4,686,645 A | 8/1987 | McCanny et al. | |
| 4,701,876 A | 10/1987 | McCanny et al. | |
| 4,803,648 A | 2/1989 | Dierckx et al. | |
| 6,526,430 B1 | 2/2003 | Hung et al. | |
| 6,731,706 B1 | 5/2004 | Acharya et al. | |
| 8,166,377 B2 | 4/2012 | Chu et al. | |
| 8,218,635 B2 | 7/2012 | Topham | |
| 10,049,082 B2 | 8/2018 | Ling et al. | |
| 2003/0198295 A1 | 10/2003 | Chen et al. | |
| 2018/0314671 A1 | 11/2018 | Zhang et al. | |
| 2019/0187983 A1* | 6/2019 | Ovsiannikov | G06N 3/08 |

(Continued)

FOREIGN PATENT DOCUMENTS

| | | |
|---|---|---|
| CA | 1 226 951 A1 | 9/1987 |
| EP | 0 144 123 A2 | 6/1985 |

(Continued)

OTHER PUBLICATIONS

Guo, et al. "Balancing efficiency and flexibility for DNN acceleration via temporal GPU-systolic array integration." arxiv.org, Cornell University Library, Feb. 18, 2020 arXiv:2002.08326v1 (7 pages).

(Continued)

*Primary Examiner* — Michael D. Yaary

(74) *Attorney, Agent, or Firm* — NSIP Law

(57) ABSTRACT

Disclosed is a method and apparatus with deep learning operations. A deep learning apparatus includes a processor, configured to support a plurality of different operation modes, including a systolic array having a plurality of multiplier accumulator (MAC) units, and a control circuit configured to respectively control, for each the plurality of different operation modes, select operations of the plurality of MAC units and data movements among the plurality of MAC units.

46 Claims, 22 Drawing Sheets

(56) References Cited

U.S. PATENT DOCUMENTS

| | | |
|---|---|---|
| 2019/0196788 A1 | 6/2019 | Han et al. |
| 2019/0228051 A1 | 7/2019 | Langhammer et al. |
| 2020/0076435 A1 | 3/2020 | Wang |

FOREIGN PATENT DOCUMENTS

| | | |
|---|---|---|
| GB | 2 144 245 B | 2/1985 |
| JP | 2003-319396 A | 11/2003 |
| KR | 10-1578052 B1 | 12/2015 |
| KR | 10-2019-0065144 A | 6/2019 |
| KR | 10-2019-0099931 A | 8/2019 |
| WO | WO 91/18347 A1 | 11/1991 |
| WO | WO 2009/014314 A1 | 1/2009 |

OTHER PUBLICATIONS

Sudha, et al. "A self-configurable systolic architecture for face recognition system based on principal component neural network." IEEE Transactions on Circuits and Systems for Video Technology (vol. 21, Issue: 8, Aug. 2011) 1071-1084.
Extended European Search Report issued Feb. 1, 2022 in counterpart European Patent Application No. 21183686.1 (9 pages in English).
Bai, Lin et al. "A CNN accelerator on FPGA using depthwise separable convolution." *IEEE Transactions on Circuits and Systems II: Express Briefs* 65.10 (2018): 1415-1419. (5 pages in English).
Korean Office Action issued on Dec. 12, 2024, in Counterpart Korean Patent Application No. 10-2020-0096333 (2 Pages in English,6 Pages in Korean).

\* cited by examiner

METHOD AND APPARATUS WITH DEEP LEARNING OPERATIONS

CROSS-REFERENCE TO RELATED APPLICATIONS

This application claims the benefit under 35 USC § 119(a) of Korean Patent Application No. 10-2020-0096333 filed on Jul. 31, 2020 in the Korean Intellectual Property Office, the entire disclosure of which is incorporated herein by reference for all purposes.

BACKGROUND

1. Field

The following description relates to a method and apparatus with deep learning operations.

2. Description of Related Art

Many artificial intelligence applications provide sophisticated but slow-responsive services through a network connection between a server and a client. An example reason is because an artificial neural network, an algorithm of deep learning, typically requires 1000 times or more computing operations than non-AI operations of general application processors (APs).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a deep learning apparatus includes a processor, configured to support a plurality of different operation modes, including a systolic array including a plurality of multiplier accumulator (MAC) units, and a control circuit configured to respectively control, for each the plurality of different operation modes, select operations of the plurality of MAC units and data movements among the plurality of MAC units.

The control circuit may be configured to control operations of accumulators of multiple MAC units of the plurality of MAC units dependent on which operation mode, from among the plurality of different operation modes, is being implemented by the control circuit.

The plurality of different operation modes may include any combination of two or more of an adder tree mode, a single instruction multiple data (SIMD) mode, a systolic adder tree mode, and a systolic mode.

The processor may be configured to perform a depth-wise convolution operation in the SIMD mode.

The plurality of different operation modes may include at least one of an adder tree mode and a systolic adder tree mode, and the control circuit may be configured to operate an accumulator of only one MAC unit of a series of MAC units, of the plurality of MAC units, in response to the adder tree mode or the systolic adder tree mode being implemented by the control circuit.

The plurality of different operation modes may further include at least one of a SIMD mode and a systolic mode, and the control circuit may be configured to control an adder in the one MAC unit to not operate in response to the SIMD mode or the systolic mode being implemented by the control circuit.

The adder of one of MAC unit may be configured to consider an adder output of a neighboring MAC unit in response to the adder tree mode or the systolic adder tree mode being implemented by the control circuit.

MAC units of the series of MAC units, other than the one MAC unit, each may have only one adder, and the one MAC unit may include plural adders.

The plurality of different operation modes may include at least one of a SIMD mode and a systolic mode, and the control circuit may be configured to control an adder of one MAC unit of a series of MAC units, of the plurality of MAC units, to not operate and to control another adder of the one MAC unit and all respective adders of other MAC units of the series of MAC units to operate, in response to the SIMD mode or the systolic mode being implemented by the control circuit.

The plurality of different operation modes may include another mode, and the adder in the one MAC may be configured to operate and to consider an adder output of a neighboring MAC unit, of the series of MAC units, in response to the other mode being implemented by the control circuit The plurality of different operation modes may include at least one of a SIMD mode or a systolic mode, and the control circuit may be configured to operate accumulators of all the plurality of MAC units in response to the SIMD mode or the systolic mode being implemented by the control circuit.

The plurality of different operation modes may include at least one of an adder tree mode and a systolic adder tree mode, and the control circuit may be configured to control data movements of an operation result from one MAC unit to an adjacent MAC unit, for each of plural adjacent MAC units, in response to the adder tree mode or the systolic adder tree mode being implemented by the control circuit.

The data movements may occur in both directions, from respective edge MAC units toward a MAC unit inward of the edge MAC units, wherein the inward MAC unit may be configured to consider respective operation results from both of the directions.

The plurality of different operation modes may further include another mode, and the control circuit may be configured to not implement the data movements in response to the other mode being implemented by the control circuit.

The systolic array may be configured with an arrangement of the plurality of MAC units in at least two rows of MAC units with at least one column of the at least two rows of MAC units, at least two columns of MAC units with at least one row of the at least two columns of MAC units, or two or more rows of MAC units with two or more columns of the two more rows of MAC units.

The plurality of different operation modes may include at least one of a systolic mode and a systolic adder tree mode, and the control circuit may be configured to control the select data movements among the plurality of MAC units, to respectively transmit input data from a first MAC unit to a second MAC unit of row adjacent MAC units for each of one or more rows of the systolic array and/or respectively transmit other input data from a third MAC unit to a fourth MAC unit of columnar adjacent MAC units for each of one or more columns of the systolic array, in response to the systolic mode or the systolic adder tree mode being implemented by the control circuit.

The control circuit may include a multiplexer disposed in at least one of the plurality of MAC units, where the multiplexer may be configured to determine an input of an adder of the at least one MAC unit.

The control circuit may include an adder tree circuit configured to receive respective outputs of multipliers of the plurality of MAC units.

The adder tree circuit may include a flip-flop inserted between adders of the adder tree circuit.

Each of the plurality of MAC units may be configured in respective processing elements (PEs) arranged in the array, where a first PE of the array may include a first respective portion of the control circuit and a first MAC unit having a first adder, a first multiplier, and a first accumulator, a second PE of the array may include a second respective portion of the control circuit and a second MAC unit having a second adder, a second multiplier, and a second accumulator, and a third PE of the array may include a third respective portion of the control circuit and a third MAC unit having a third adder, a third multiplier, and a third accumulator.

The plurality of different operation modes may include any combination of two or more of an adder tree mode, a single instruction multiple data (SIMD) mode, a systolic adder tree mode, and a systolic mode, and the control circuit may be configured to respectively control select operations of the first, second, and third MAC units, and control the first respective portion, the second respective portion, and the third respective portion to control select pipelining of inputs and/or outputs of the first, second, and third MAC units, depending on which of the plurality of different operation modes is indicated through a mode signal provided to the first PE, the second PE, and the third PE.

The first respective portion of the control circuit may include a first multiplexer configured to determine one of an output of the first accumulator or an output of a neighboring processing element to be an input of the first adder, the second respective portion of the control circuit may include a second multiplexer configured to determine one of a predetermined value or an output of the second multiplier to be an input of the second adder, and the third respective portion of the control circuit may include a third multiplexer configured to determine one of an output of the third adder or a sum of the output of the third adder and outputs of neighboring processing elements to be an input of the third accumulator.

In one general aspect, a device includes an array of a plurality of processing elements, where the plurality of processing elements may include any one or any combination of a first processing element of the array, the first processing element including a first multiplexer configured to determine one of an output of an accumulator of the first processing element or an output of a neighboring processing element to be an input of an adder of the first processing element, a second processing element of the array, the second processing element including a second multiplexer configured to determine one of a predetermined value or an output of a multiplier of the second processing element to be an input of an adder of the second processing element, and a third processing element including a third multiplexer configured to determine one of an output of an adder of the third processing element or a sum of the output of the adder of the third processing element and outputs of neighboring processing elements to be an input of an accumulator of the third processing element.

The device may include the first processing element, the second processing element, and the third processing element, and the first processing element may include the first multiplexer as a first portion of a control circuit of the device, and a first multiplier accumulator (MAC) unit having the adder of the first processing element, a multiplier of the first processing element, and the accumulator of the first processing element, the second processing element may include the second multiplexer as a second portion of the control circuit, and a second MAC unit having the adder of the second processing element, the multiplier of the second processing element, and an accumulator of the second processing element, and a third processing element may include the third multiplexer as a third portion of the control circuit, and a third MAC unit having the adder of the third processing element, a multiplier of the third processing element, and the accumulator of the third processing element.

The device may configure into different operation modes of selective pipelining of inputs and/or outputs through neighboring MAC units dependent on corresponding operation mode specific operations of the first multiplexer, the second multiplexer, and the third multiplexer, and where the different operation modes may include at least two of an adder tree mode, a single instruction multiple data (SIMD) mode, a systolic adder tree mode, and a systolic mode.

In response to an adder tree mode of operation of the device, the first multiplexer of the first processing element may be configured to determine the output of the neighboring processing element to be the input of the adder of the first processing element, the second multiplexer of the second processing element may be configured to determine the output of the multiplier of the second processing element to be the input of the adder of the second processing element, and the third multiplexer of the third processing element may be configured to determine the sum of the output of the adder of the third processing element and the outputs of the neighboring processing elements to be the input of the accumulator of the third processing element.

In response to the adder tree mode of operation of the device, an accumulator of the second processing element and the accumulator of the third processing element may not operate.

In response to a single instruction multiple data (SIMD) mode of operation of the device, the first multiplexer of the first processing element may be configured to determine the output of the accumulator of the first processing element to be the input of the adder of the first processing element, the second multiplexer of the second processing element may be configured to determine the predetermined value to be the input of the adder of the second processing element, and the third multiplexer of the third processing element may be configured to determine the output of the adder of the third processing element to be the input of the accumulator of the third processing element.

The third processing element may further include a fourth adder configured to add the outputs of the neighboring processing elements, and a fifth adder configured to add the output of the adder of the third processing element and an output of the fourth adder.

In response to a SIMD mode of operation of the device, the fourth adder and the fifth adder of the third processing element may not operate.

In one general aspect, a deep learning method includes receiving input data, receiving an indication of an operation mode, and controlling operations of a plurality of multiplier accumulator (MAC) units, arranged in a systolic array, and data movements among the plurality of MAC units in response to the indicated operation mode.

The controlling of operations of the plurality of MAC units and data movements among the plurality of MAC units includes controlling operations of two or more of the plurality of MAC units and/or data movements among the two or more of the plurality of MAC units in response to application of the received indication of the operation mode to control circuitry respectively arranged in the systolic array with respect to at least one of the two or more of the plurality of MAC units.

The indicated operation mode may be an operation mode among a plurality of different operation modes, and of any two or more of an adder tree mode, a single instruction multiple data (SIMD) mode, a systolic adder tree mode, and a systolic mode, and, with respect to different operation mode indications respectively for the plurality of different operation modes, each of the different operation mode indications respectively applied to one or more MAC units of the plurality of MAC units and/or control circuitry respective to each of at least one of the one or more MAC units, may differently configures the systolic array with respect to selective use of all components of each of one or more of the plurality of MAC units and/or with respect to selective data movements among at least an adjacent pair of MAC units among the plurality of MAC units.

The controlling of operations of the plurality of MAC units and data movements among the plurality of MAC units may include controlling use of accumulators of the plurality of MAC units in response to the indicated operation mode.

In response to the indicated operation mode being a single instruction multiple data (SIMD) mode or a systolic mode, the controlling may control the operations of MAC units in a series of adjacent MAC units in the systolic array so as to operate accumulators of all the MAC units in the series of adjacent MAC units.

In response to the indicated operation mode being an adder tree mode or a systolic adder tree mode, the controlling may control operations of MAC units in a series of adjacent MAC units in the systolic array so as to use only one accumulator of one MAC unit among all accumulators of all of the MAC units in the series of adjacent MAC units.

In response to the indicated operation mode being a single instruction multiple data (SIMD) mode or a systolic mode, the controlling may control operations of the MAC units in the series of adjacent MAC units so that the one MAC unit does not operate an adder of the one MAC unit, wherein operation of the adder may implement of data movements to the one Mac unit from one or more other MAC units in the series of adjacent MAC units.

In response to the indicated operation mode being the SIMD mode or the systolic mode, the controlling may control the operations of the MAC units in the series of adjacent MAC units to operate accumulators of all the MAC units in the series of adjacent MAC units.

In response to the indicated operation mode being an adder tree mode or a systolic adder tree mode, the controlling may control data movements among MAC units in a series of adjacent MAC units in the systolic array so as to receive by one of the series of adjacent MAC units an operation result from one or more other MAC units of the series of adjacent MAC units In response to the indicated operation being a systolic mode or a systolic adder tree mode, the controlling may control data movements between MAC units along a row of the systolic array so as respectively transmit first input data from one of the MAC units along the row to another one or more of the MAC units along the row, and/or control data movements between MAC units along a column of the systolic array so as respectively transmit second input data from one of the MAC units along column to another one or more of the MAC units along the column.

In one general aspect, one or more embodiments include a non-transitory computer-readable storage medium storing instructions that, when executed by a processor, cause the processor to perform one or more or all operations or method described herein.

In one general aspect, a deep learning apparatus includes a processor, configured to support a plurality of different operation modes, the processor including a systolic array having a plurality of multiplier accumulator (MAC) units arranged in two dimensions of rows and columns, and configurable respective row input and/or output data communication paths among multiple MAC units for each of a plurality of the rows, and configurable respective column input and/or output data communication paths among multiple MAC units for each of a plurality of the columns, and a control circuitry, for the systolic array, configured to respectively reconfigure the systolic array to respectively operate differently in at least two of an adder tree mode, a single instruction multiple data (SIMD) mode, a systolic adder tree mode, and a systolic mode for input data.

The systolic array may further include a plurality of MAC units arranged in a third dimension.

Each of the plurality of MAC units may be included in a corresponding respective processing element (PE) arranged in the two dimensions of columns and rows, and a plurality of the PEs each may include control circuitry portions that, upon application of an operation mode signal, respectively control select use of components of each of respective MAC units of a multiple number of the plurality of PEs, and/or respectively control of which of the respective row input data communication paths and/or respective row output data communication paths are configured to be implemented and not implemented, and/or control of which of the respective column input data communications paths and/or respective column output data communication paths are configured to be implemented and not implemented.

When the operation mode is the SIMD mode, the input data may include activation feature data respectively input to multiple rows of the plurality of rows and respectively communicated along each of the multiple rows using the implemented respective row input data communication paths, the input data may include neural network filter weights, respectively input to multiple columns of the plurality of columns and respectively communicated along each of the multiple columns using the implemented respective column input data communication paths, and output data of the systolic array may be provided by respective summations for each of the multiple columns of the systolic array, each respective summation being a summation of multiplier results of one or more rows of processing elements for a corresponding column through the implemented respective column output data communications paths, as results of a depth-wise convolution of the activation feature data and the neural network filter weights.

Other features and aspects will be apparent from the following detailed description, the drawings, and the claims.

Figure 1A:
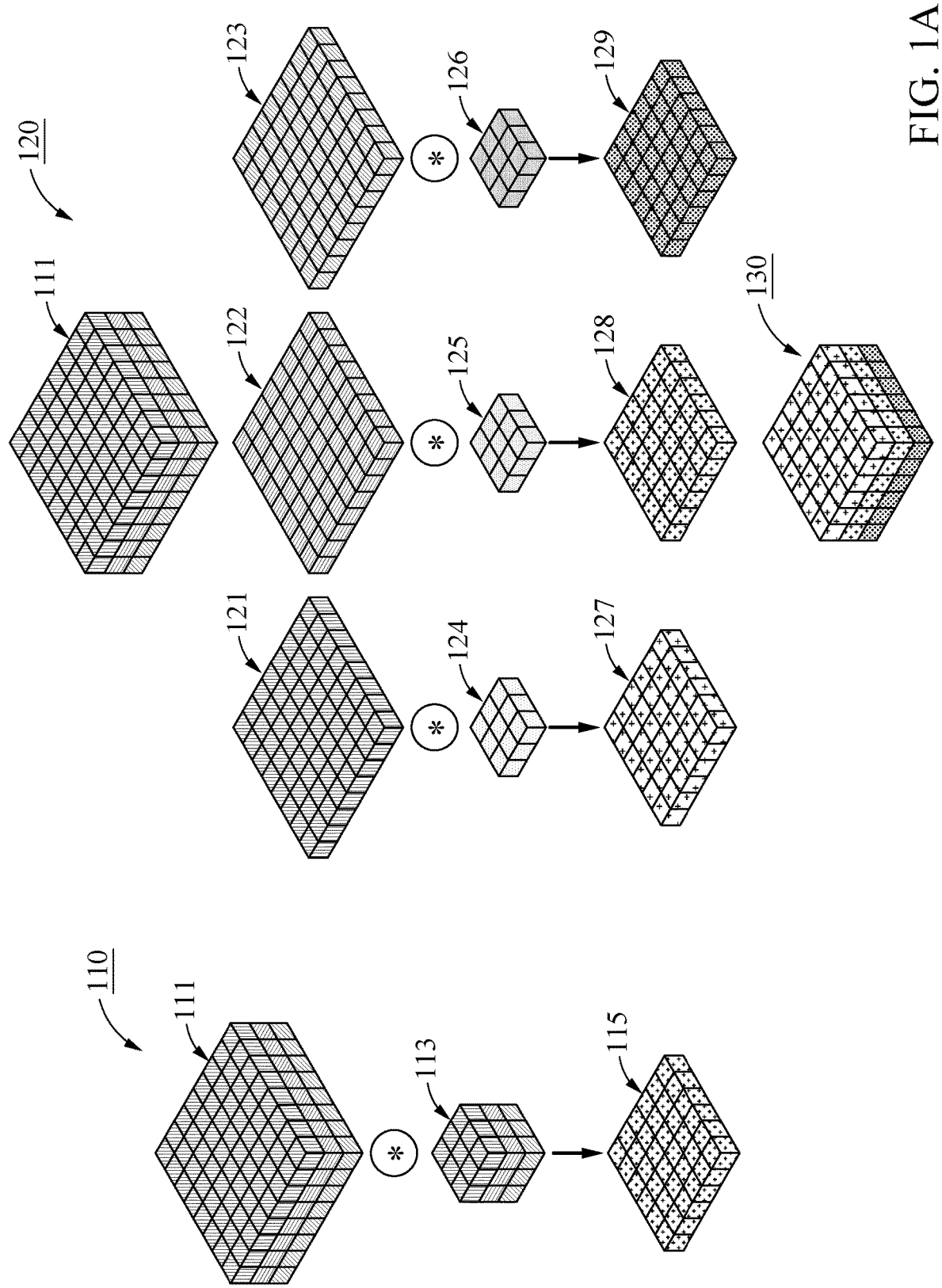
FIG. 1A illustrates an example of an artificial neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between", "directly between," and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description could cause ambiguous interpretation of the example embodiments. Examples will be described in detail with reference to the accompanying drawings, and like reference numerals in the drawings refer to like elements throughout.

Example apparatuses include various types of products or electronic devices such as, for example, a data center, a server, a personal computer, a laptop computer, a tablet computer, a smart phone, a television, a smart home appliance, an intelligent vehicle, a kiosk, and a wearable device, as apparatuses configured to perform deep learning operations.

Figure 1B:
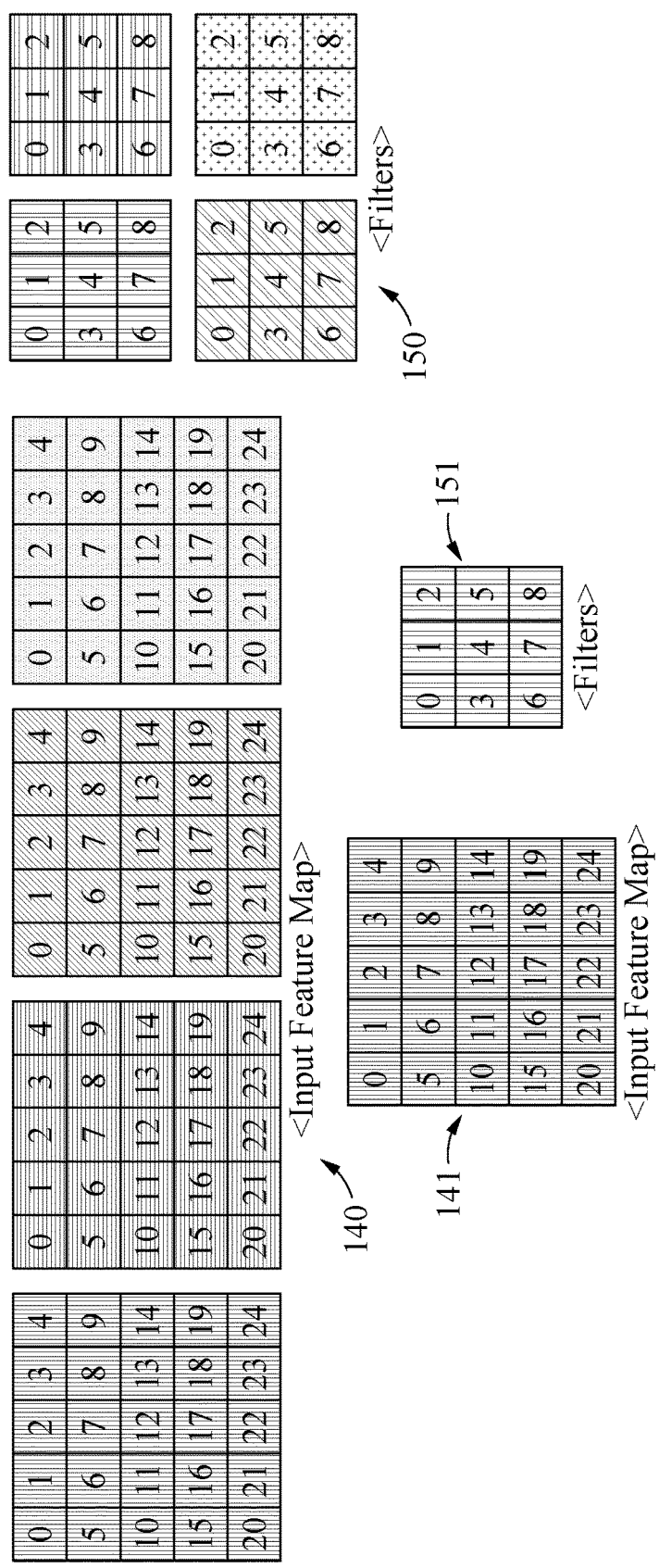
FIG. 1B illustrates an example of a method of performing deep learning operations using an adder tree structure.
Figure 1B:
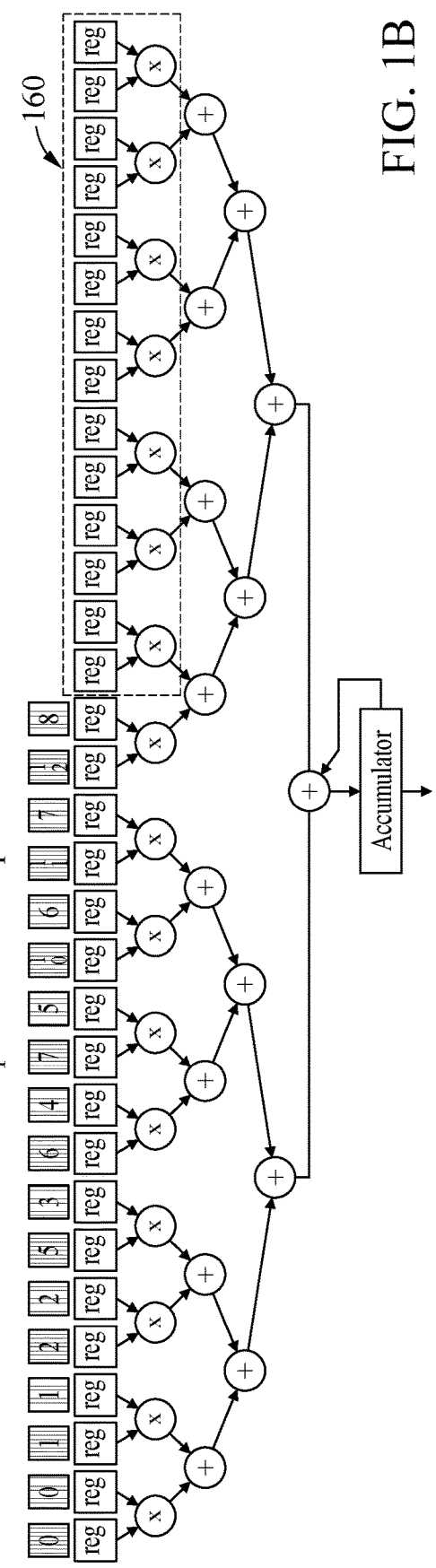
Figure 10:
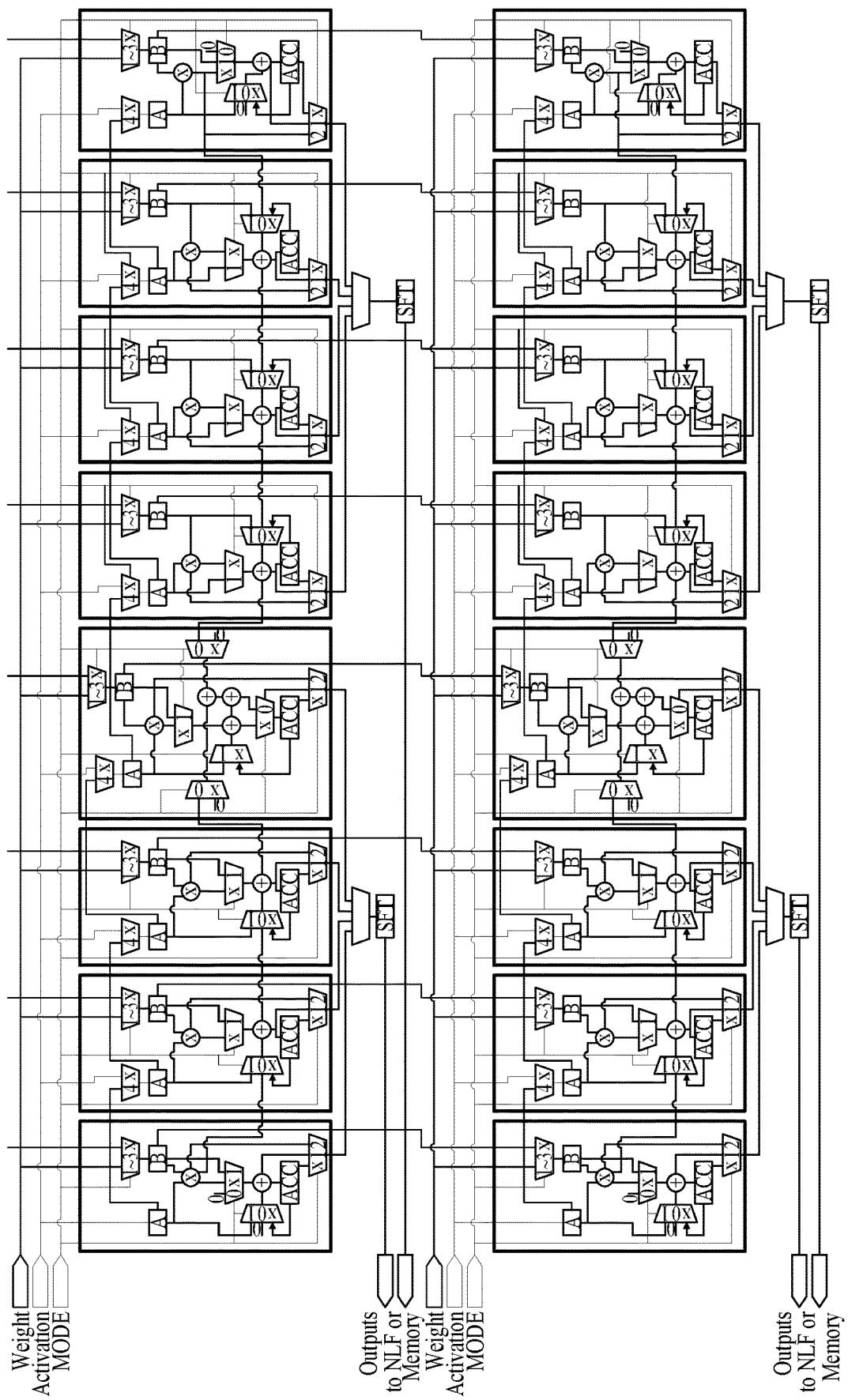
FIG. 10 illustrates an example of an apparatus, configured to perform deep learning operations, with a systolic adder tree mode, a plurality of SIMD modes, and a systolic mode.

FIG. 1A illustrates an example of an artificial neural network, FIG. 1B illustrates an example of a method of performing deep learning operations using an adder tree structure, and FIG. 10 illustrates an example of a method of performing deep learning operations using a single instruction multiple data (SIMD) structure including a plurality of multiplier accumulator (MAC) units. The term "unit"

described herein references a hardware component or a combination of the hardware component and instructions.

An artificial intelligence (AI) algorithm implementing the deep learning technique may input training data to an artificial neural network to train the artificial neural network with output data and potentially labeled information, for operations of the artificial neural network such as convolution. The trained artificial network may thereafter be used, e.g., to implement such a convolution or other operation(s), to extract features for input information. In the artificial neural network, nodes are connected, e.g., through weighted connections, to each other and collectively operate to process the input data. There are various types of artificial neural networks, for example, a feed-forward artificial neural network, a convolutional neural network (CNN), a recurrent neural network (RNN), a deep belief network (DBN), restricted Boltzman machine (RBM) method, and the like and as non-limiting examples, and any combination of any two more of such types of artificial neural networks. However, examples are not limited thereto. In a feed-forward artificial neural network, for example, nodes of the artificial neural network have weighted connections or links to other nodes of the artificial neural network. Such links may extend in one direction, for example, in a forward direction, through plural layers of the artificial neural network, where each layer includes multiple nodes and the weighted connections or links are between nodes of different layers. In an RNN example, the artificial neural network may further include such weighted connection or links to the same nodes of the same layer at a different time.

Among such various types of artificial neural networks, a CNN may be used to extract features from input data. For example, the CNN may extract visual features such as edges, lines, colors, and the like from an input image. The CNN may include a plurality of layers, and each layer may receive and process respective input data to generate data to be output. For example, the data output from a layer may be a feature map generated by performing a convolution operation between an image or input feature map and a trained weight of a filter, also referred to as a kernel. In an example, initial layers of the CNN may extract simple features such as edges or gradients from the input, and subsequent layers of the CNN may extract progressively more complex features such as eyes, nose, and the like from the image.

Referring to FIG. 1A, a convolution operation 110 may include a process of generating a 6×6 single-channel output feature map 115 by performing multiply and add operations between an 8×8 three-channel input feature map and a 3×3 three-channel filter 113. The size of data may be defined by (width, height) and the number of channels. For example, this size of the output feature map 115 may also be referred to as a volume.

A depth-wise convolution operation 120 may perform a convolution operation only within the same channel, and extract a spatial feature of each channel through this. The depth-wise convolution operation 120 may include a process of generating a 6×6 three-channel output feature map 130 including output feature maps 127, 128, and 129 corresponding to respective input channels, by performing, for each input channel, a convolution operation between the 8×8 three-channel input feature map 111 and each of three 3×3 filters 124, 125, and 126. In detail, the output feature map 127 of the first output channel may be generated by performing multiply and add operations between an input feature map 121 of the first input channel and the first filter 124. Similarly, the output feature map 128 of the second output channel may be generated by performing multiply and add operations between an input feature map 122 of the second input channel and the second filter 125, and the output feature map 129 of the third output channel may be generated by performing multiply and add operations between an input feature map 123 of the third input channel and the third filter 126.

Referring to FIG. 1B, an apparatus, configured to perform deep learning operations, may use an adder tree structure that can be driven with low power when performing a convolution operation. The adder tree structure may include a plurality of multipliers configured to calculate a product of two items of data, adders configured to calculate the sum of outputs of two adjacent multipliers or the sum of two adjacent adders, and an accumulator configured to calculate the cumulative sum of final output data. The adder tree structure using only a small number of accumulators (for example, a single accumulator) may perform a convolution operation with low power.

For example, the adder tree structure may perform a convolution operation between a 5×5 four-channel input feature map 140 and four 3×3 filters 150, e.g., specifically between nine items of data 0, 1, 2, 5, 6, 7, 10, 11, and 12 of an input feature map 141 and weights 0 to 8 of a first filter 151. The multipliers of the adder tree structure may calculate products of the data of the input feature map 141 of the first input channel and the weights of the first filter 151, and the adders of the adder tree structure may accumulate and add the output values of the multipliers, that is, 0×0, 1×1, 2×2, 5×3, 6×4, 7×5, 10×6, 11×7, and 12×8.

Since a general convolution operation accumulates and adds output values of input feature maps of each input channel, the multipliers 160 that are not used for the convolution operation between the input feature map 141 and the filter 151 may be used to perform a convolution operation on an input feature map of another input channel. However, the depth-wise convolution operation performs a convolution operation for each input feature map of each input channel. Thus, when a depth-wise convolution operation is performed using the adder tree structure, the multipliers 160 may not all be used, resulting in a decrease in resource utilization.

In addition, since the convolution operation using the adder tree structure has a long data path, the apparatus may operate at a low clock frequency. Accordingly, the adder tree structure is suitable for performing general convolution operations but may not typically be suitable for operations for parallel processing of data such as depth-wise convolution operations. Furthermore, when the adder tree structure is used to perform an asymmetric convolution operation with an asymmetric filter such as a 7×1, 1×7, 3×1, or 1×3 filter, the resource utilization efficiency may also further decrease.

Figure 1C:
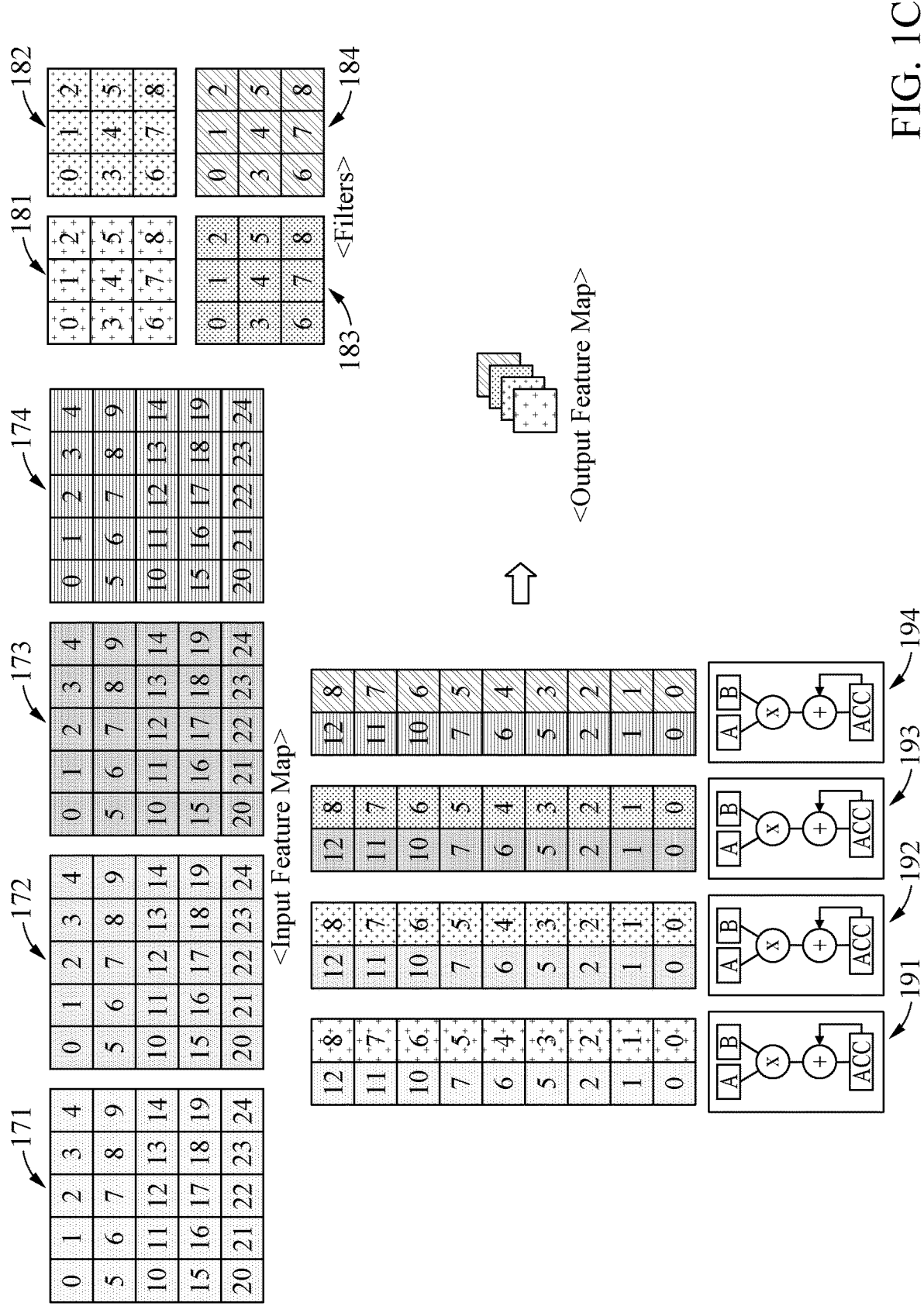
FIG. 1C illustrates an example of a method of performing deep learning operations using a single instruction multiple data (SIMD) structure including a plurality of multiplier accumulator (MAC) units.

Referring to FIG. 1C, an apparatus, configured to perform deep learning operations, may perform a depth-wise convolution operation using an included SIMD structure including a plurality of MAC units.

The SIMD structure includes many processing elements (PEs) 191, 192, 193, and 194 configured to perform the same operation, for example, and thus many operations may be performed simultaneously by inputting data into each of the PEs. Each PE of the SIMD structure may be configured as a MAC unit to perform an operation of ACC=ACC+(A×B).

In the SIMD structure, each MAC unit includes an ACC accumulator. Thus, it may be suitable for performing a depth-wise convolution operation of performing a convolution operation for each channel. For example, each PE 191, 192, 193, 194 of the SIMD structure may perform a depthwise convolution operation respectively between a 5×5 four-channel input feature map 171, 172, 173, 174 and a 3×3 filter 181, 182, 183, 184. In detail, the PE 191 may perform a convolution operation between the input feature map 171 and the filter 181, the PE 192 may perform a convolution operation between the input feature map 172 and the filter 182, the PE 193 may perform a convolution operation between the input feature map 173 and the filter 183, and the PE 194 may perform a convolution operation between the input feature map 174 and the filter 184. In addition, the SIMD structure may have a short data path for operation and thus, may operate at a high clock frequency.

However, such a SIMD structure may require an accumulator for every MAC unit and thus, result in greater power consumption. For example, while a single accumulator is sufficient to perform a general convolution operation using the adder tree structure, when performing a general convolution operation using the SIMD structure all accumulators may operate, resulting in a decrease in power efficiency with the SIMD structure compared to the adder tree structure. Accordingly, while the SIMD structure is suitable for operations for parallel processing of data such as depth-wise convolution operations, the SIMD structure may not be as suitable for performing general convolution operations.

As described above, the adder tree structure may be more suitable for performing general convolution operations, but may not be as suitable for asymmetric convolution operations using asymmetric filters and operations for parallel processing of data such as depth-wise convolution operations, and conversely, the SIMD structure may be more suitable for operations for parallel processing of data such as depth-wise convolution operations, but may not be as suitable for performing general convolution operations.

Figure 2:
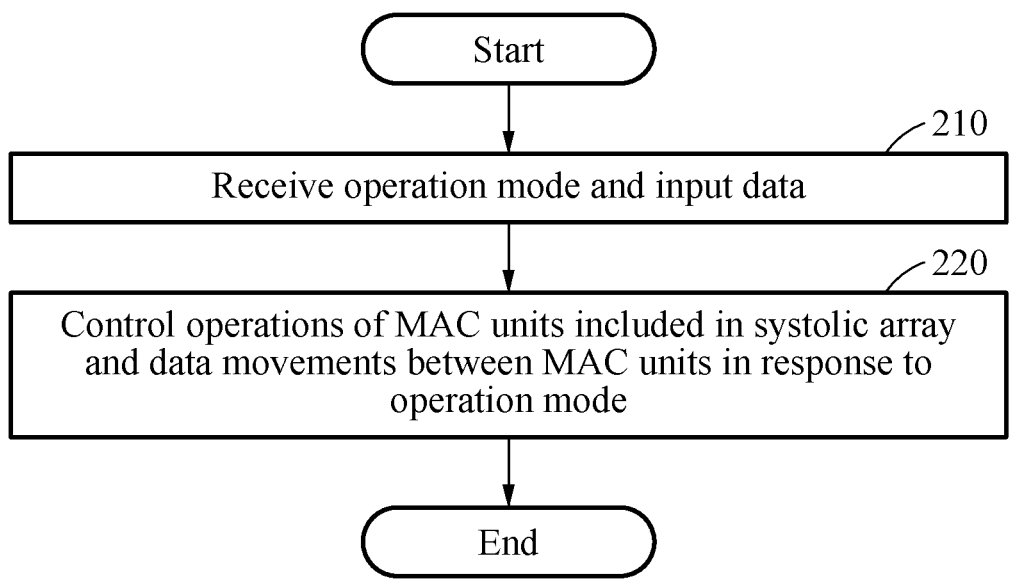
FIG. 2 illustrates an example of a method of performing deep learning operations.

FIG. 2 illustrates an example of a method of performing deep learning operations according to one or more embodiments.

Referring to FIG. 2, operations 210 and 220 may be performed by the apparatus configured to perform deep learning operations as described above and below. The apparatus may be implemented by one or more hardware modules, though examples also include the apparatus implementing the deep learning operations using various combinations of hardware and instructions implemented or executed by the hardware.

In operation 210, the apparatus receives an operation mode and input data. The apparatus may be implemented to select an operation mode, where the selectable operation modes may include an adder tree mode, a systolic adder tree mode, a SIMD mode, and/or a systolic mode.

In operation 220, the apparatus may control operations of MAC units included in the systolic array and data movements between the MAC units in response to the selected operation mode. The apparatus may perform an operation corresponding to the received/selected operation mode. For example, the apparatus may be selected to operate in an adder tree mode to perform a general convolution operation and may alternatively be selected to operate in a SIMD mode to perform a depth-wise convolution operation.

Specifically, the apparatus may control the operations of the MAC units included in the systolic array so as to operate in a mode determined most suitable for a predetermined operation. For example, the apparatus may control the operations of the MAC units so as to use only an accumulator of any one of the MAC units included in the systolic array and perform a general convolution operation. In the SIMD mode, the apparatus may control the operations of the MAC units so as to respectively use accumulators of all the MAC units included in the systolic array and perform an operation for parallel processing of data such as a depth-wise convolution operation.

In addition, the apparatus may control the data movements between the MAC units included in the systolic array. For example, in the adder tree mode, the apparatus may control data movements between MAC units so as to receive an operation result from an adjacent MAC unit.

Although it will be described in greater detail below, in a systolic adder tree mode, the apparatus may perform an operation of the adder tree mode, while controlling the data movements between the MAC units such that input data of the systolic array are transferred to MAC units arranged along a column in a pipelining manner. In addition, in a systolic mode, the apparatus may control the data movements between the MAC units so as to transfer the input data of the systolic array to the MAC units along a row or column.

As described herein, the apparatus may support a plurality of operation modes and perform an operation determined or predetermined suitable for a corresponding operation mode.

For example, as described in greater detail below, the apparatus may support a plurality of operation modes using a systolic array of a structure in which inputs and/or outputs of adjacent MAC units are pipelined. Thus, such an apparatus may include technology for achieving both high operation processing speed and high power efficiency.

Figure 3:
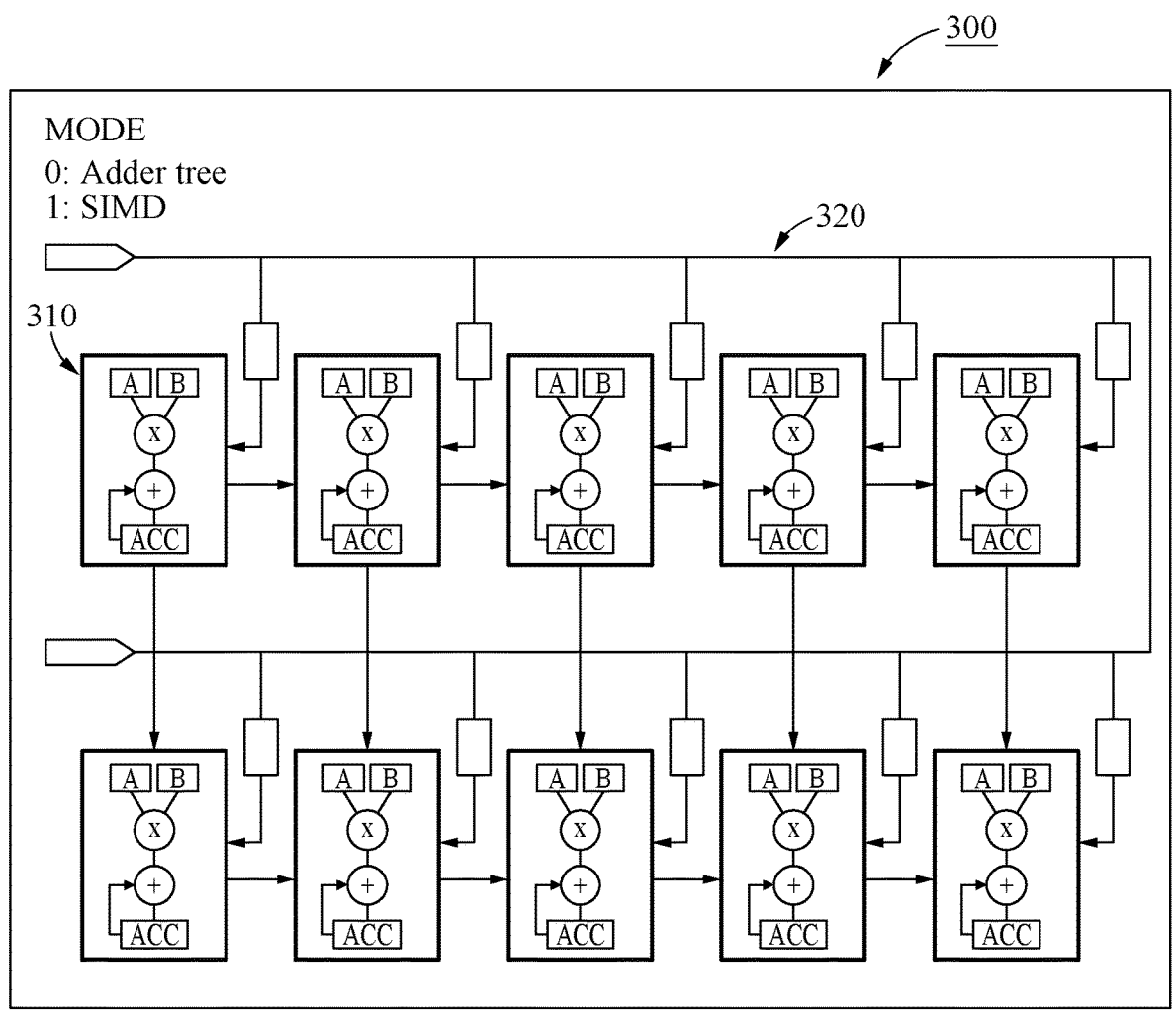
FIG. 3 illustrates an example of a structure of an apparatus configured to perform deep learning operations.

FIG. 3 illustrates an example of a structure of an apparatus configured to perform deep learning operations.

Referring to FIG. 3, an apparatus, configured to perform deep learning operations, includes a processor 300 configured to support a plurality of operation modes. The processor 300 may include a plurality of PEs, and the PEs may be respectively configured as MAC units 310. The processor 300 may have a cell array structure in which cells corresponding to the MAC units 310 are arranged in an array structure, and in particular, may have a systolic array structure in which adjacent MAC units 310 are connected to each other.

The processor 300 may include a control circuit 320 configured to control operations of the MAC units 310 included in the systolic array and data movements between the MAC units 310 in response to the plurality of operation modes. The control circuit 320 may control the MAC units 310 through a control path. However, the apparatus shown in FIG. 3 is only described as an example, and specific structures such as the number of MAC units 310 and the control path may vary in different examples.

The apparatus may support the plurality of operation modes using the control circuit 320. The control circuit 320 may control operations of accumulators of the MAC units 310 included in the systolic array in response to the plurality of operation modes. For example, the control circuit 320 may control the operations of the MAC units so as to operate only an accumulator of one of the MAC units 310 in response to an adder tree mode. The operation of the apparatus in the adder tree mode will be described in detail below with reference to an apparatus 410 of FIG. 4A. In addition, the control circuit 320 may control the operations of the MAC units so as to operate accumulators of all the MAC units 310 included in the systolic array in response to a SIMD mode. The operation of the apparatus in the SIMD mode will be described in detail below with reference to an apparatus 420 of FIG. 4A.

Figure 4A:
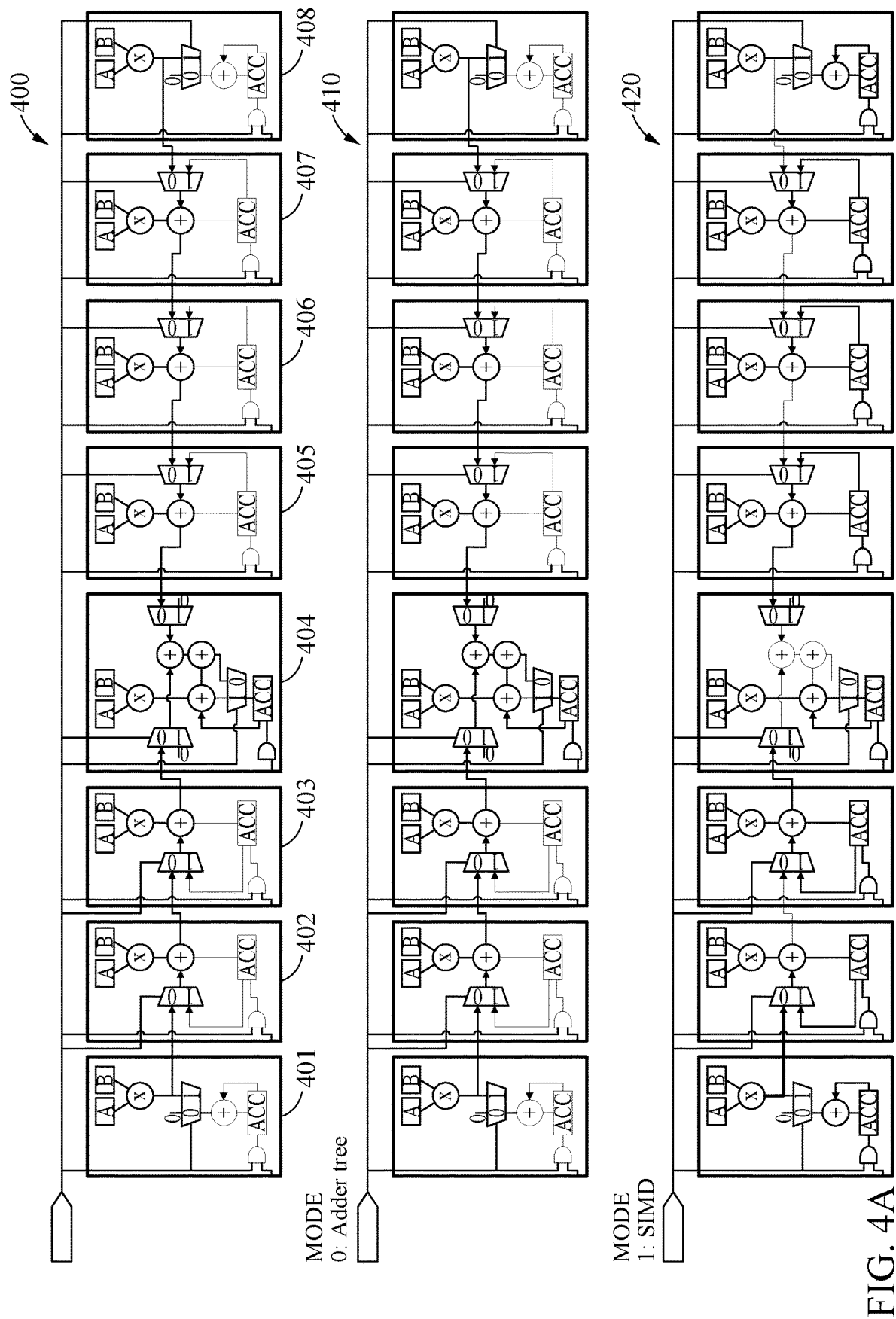
FIGS. 4A to 4C illustrate examples of apparatuses, configured to perform deep learning operations, with an adder tree mode and a SIMD mode.
Figure 4B:
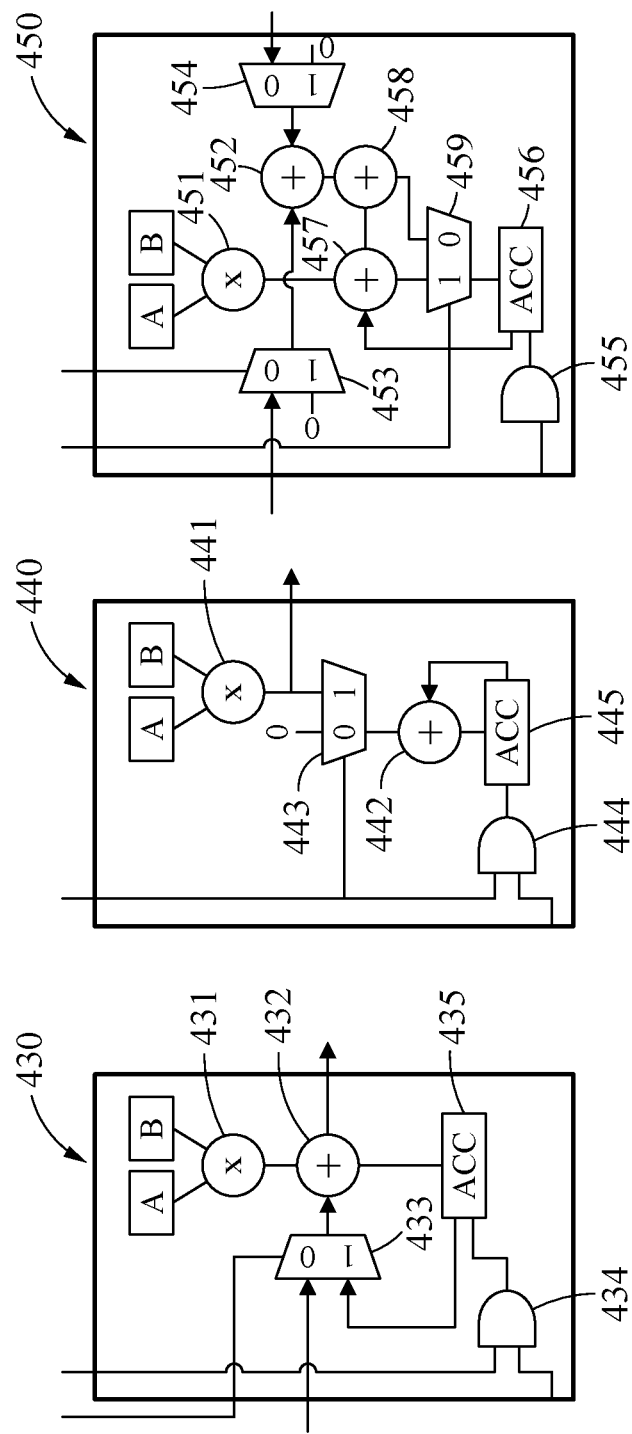
Figure 4C:
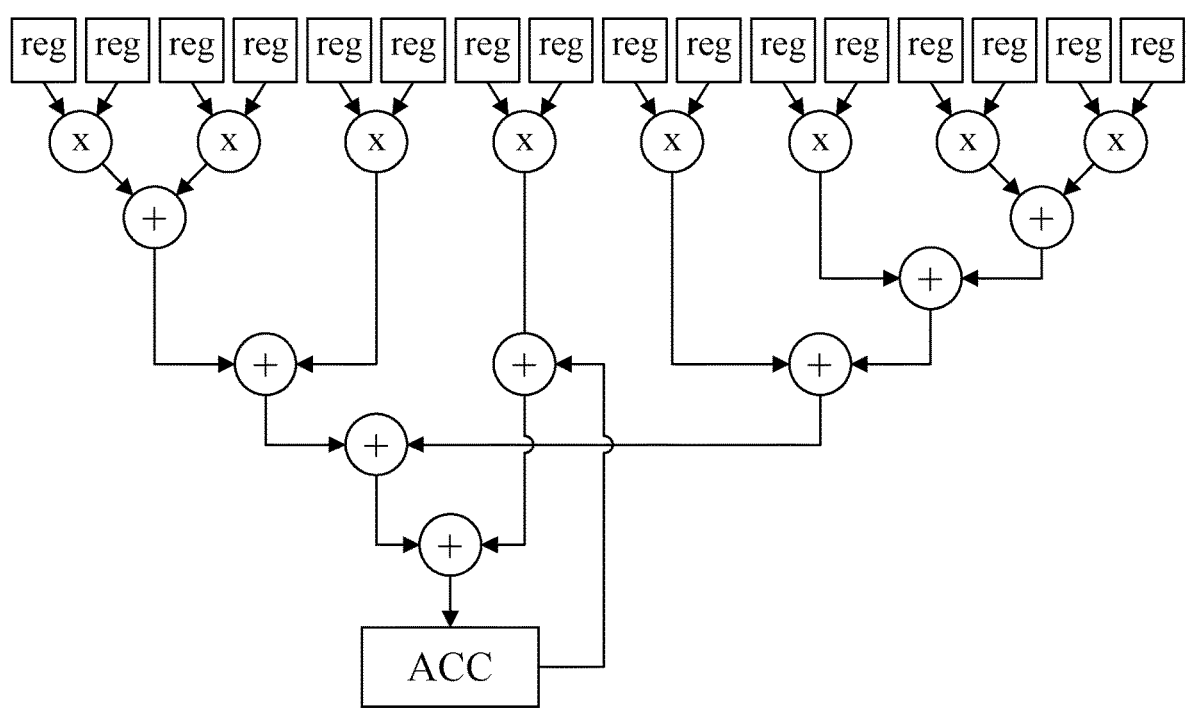

FIGS. 4A to 4C illustrate examples of apparatuses, configured to perform deep learning operations, with an adder tree mode and a SIMD mode.

Referring to FIG. 4A, an apparatus 400, configured to perform deep learning operations, may operate in an adder tree mode or a SIMD mode. For example, the apparatus 400 may operate in the adder tree mode when a control signal "0" is input and operate in the SIMD mode when a control signal "1" is input.

A control circuit may include multiplexers (MUX) disposed in MAC units to determine inputs of adders. The apparatus 400 may control data movements between the MAC units using the multiplexers. For example, the multiplexers may be respectively disposed in the MAC units, or may be disposed only in a portion of the MAC units. In examples where the multiplexers are disposed only in a portion of the MAC units, a predetermined multiplexer may control a plurality of MAC units together.

The apparatus 400 of FIG. 4A may include a plurality of PEs 401 to 408. Each of the PEs 401 to 408 may include a MAC unit and a control circuit and have a different control circuit depending on the type of the PE. Types of processing arrays that may make up the array of FIG. 4A will be described with reference to FIG. 4B.

Referring to FIG. 4B, the apparatus 400 may include a combination of a first PE 430, a second PE 440, and/or a third PE 450.

The first PE 430 may include a first multiplier 431, a first adder 432, and a first accumulator 435 making up a MAC unit, and a first multiplexer 433 and a first AND gate 434 making up a control circuit.

The first multiplexer 433 may determine one of an output of the first accumulator 435 or an output of a neighboring PE to be an input of the first adder 432. In an adder tree mode (for example, when a control signal "0" is input), the first multiplexer 433 may determine the output of the neighboring PE to be the input of the first adder 432. In a SIMD mode (for example, when a control signal "1" is input), the first multiplexer 433 may determine the output of the first accumulator 435 to be the input of the first adder 432.

The second PE 440 may be a PE positioned at the edge, e.g., an edge of the example array of PEs, and may include a second multiplier 441, a second adder 442, and a second accumulator 445 making up a MAC unit, and a second multiplexer 443 and a second AND gate 444 making up a control circuit.

The second multiplexer 443 may determine one between a predetermined value (for example, "0") and an output of the second multiplier 441, to be an input of the second adder 442. In the adder tree mode (for example, when the control signal "0" is input), the second multiplexer 443 may determine the predetermined value (for example, "0") to be the input of the second adder 442. In the SIMD mode (for example, when the control signal "1" is input), the second multiplexer 443 may determine the output of the second multiplier 441 to be the input of the second adder 442.

The third PE 450 is a PE configured to output a final output value in the adder tree mode, and may include a third multiplier 451, a third adder 457, and a third accumulator 456 making up a MAC unit, and a fourth adder 452, a third multiplexer 453, a fourth multiplexer 454, a third AND gate 455, a fifth adder 458, and a fifth multiplexer 459 making up a control circuit.

The fifth multiplexer 459 may determine one between an output of the third adder 457 and the sum of the output of the third adder 457 and outputs of neighboring PEs, to be an input of the third accumulator 456.

In the adder tree mode (for example, when the control signal "0" is input), the outputs of the respectively neighboring PEs may be input through the third multiplexer 453 and the fourth multiplexer 454, and the fourth adder 452 may add the outputs of the neighboring PEs. In addition, the third adder 457 may add the output of the third multiplier 451 and the output of the third accumulator 456. The fifth multiplexer 459 may determine an output of the fifth adder 458, which adds an output of the third adder 457 and an output of the fourth adder 452, to be an input of the third accumulator 456. In the SIMD mode (for example, when the control signal "1" is input), the fifth multiplexer 459 may determine an output of the third adder 457 to be the input of the third accumulator 456.

Referring back to FIG. 4A, the PEs 401 and 408 of the apparatus 400 may have a structure of the second PE 440 of FIG. 4B, the PEs 402, 403, 405, 406, and 407 may have a structure of the first PE 430 of FIG. 4B, and the PE 404 may have a structure of the third PE 440 of FIG. 4B.

The apparatus 410 shows an example of operating in an adder tree mode when the control signal "0" is input. As described above, when the control signal "0" is input, only an accumulator of a MAC unit included in the PE 404 may operate, and accumulators of MAC units included in the remaining PEs may not operate. Adders of MAC units included in the PEs 401 and 408 may also not operate. By limiting the operations of the accumulators and the adders as described above, the adder tree mode may reduce power consumption. Also, multiplexers included in control circuits of the PEs 402 to 407 may receive data from neighboring MAC units and perform operations as an adder tree. For example, the apparatus 410 in the adder tree mode may perform an operation the same as that represented by the adder tree of FIG. 4C.

The apparatus 420 of FIG. 4A shows an example of operating in a SIMD mode when the control signal "1" is input. As described above, when the control signal "1" is input, the accumulators of the respective MAC units included in all of the PEs 401 to 408 may operate. Meanwhile, adders of the control circuit included in the PE 404 may not operate. For example, the operations of adders not in use may be limited by controlling an output value of a multiplexer connected to inputs of the adders not in use to be "0", and thereby may reduce power consumption.

Figure 5A:
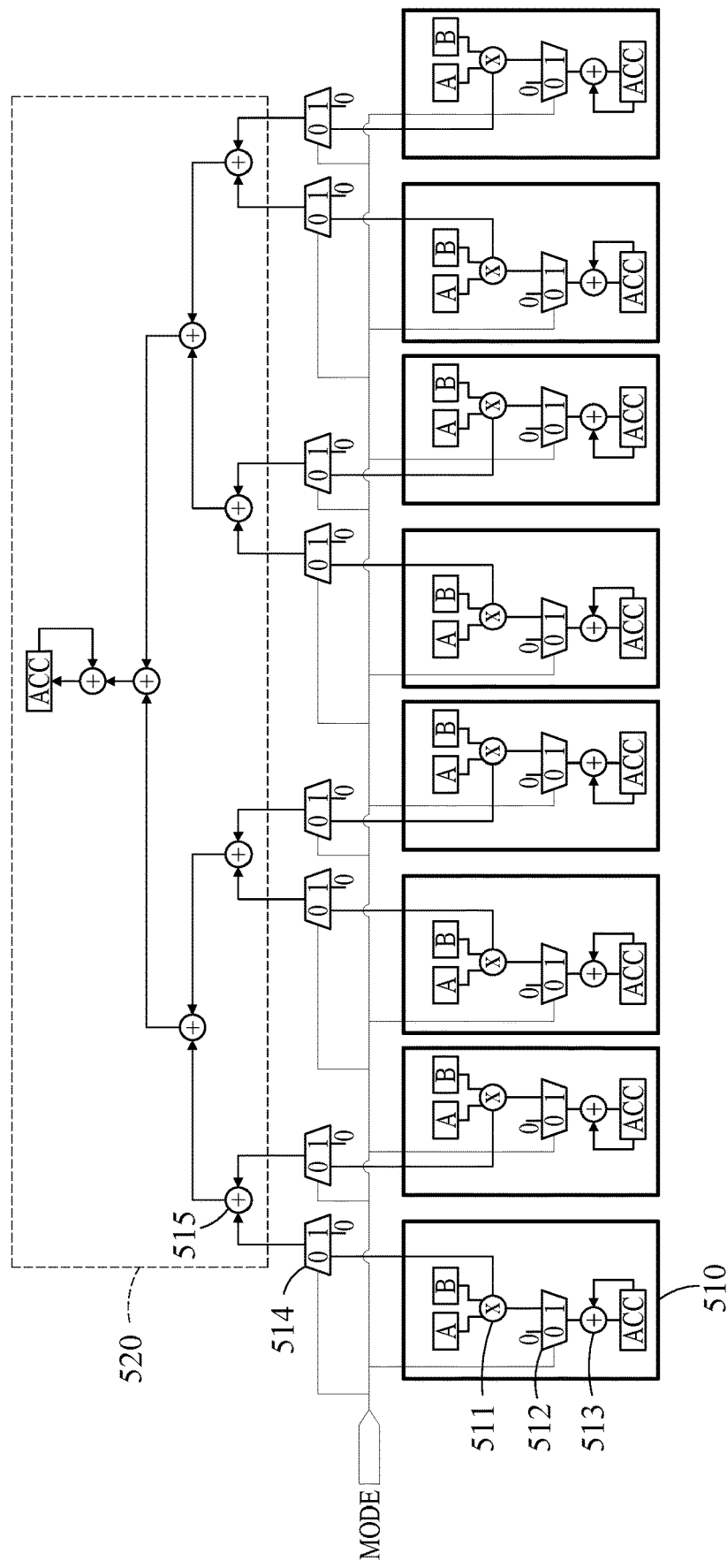
FIGS. 5A to 5C illustrate examples of apparatuses configured to perform deep learning operations.
Figure 5B:
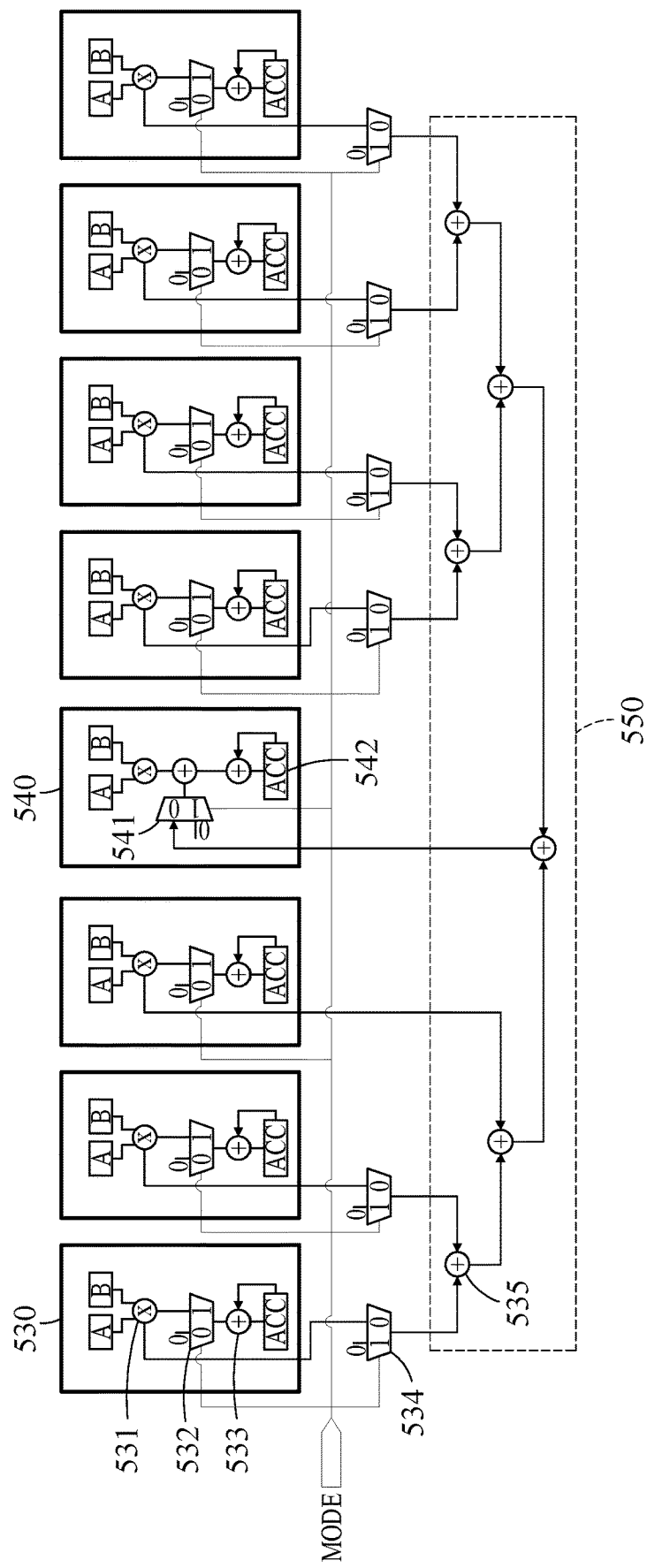
Figure 5C:
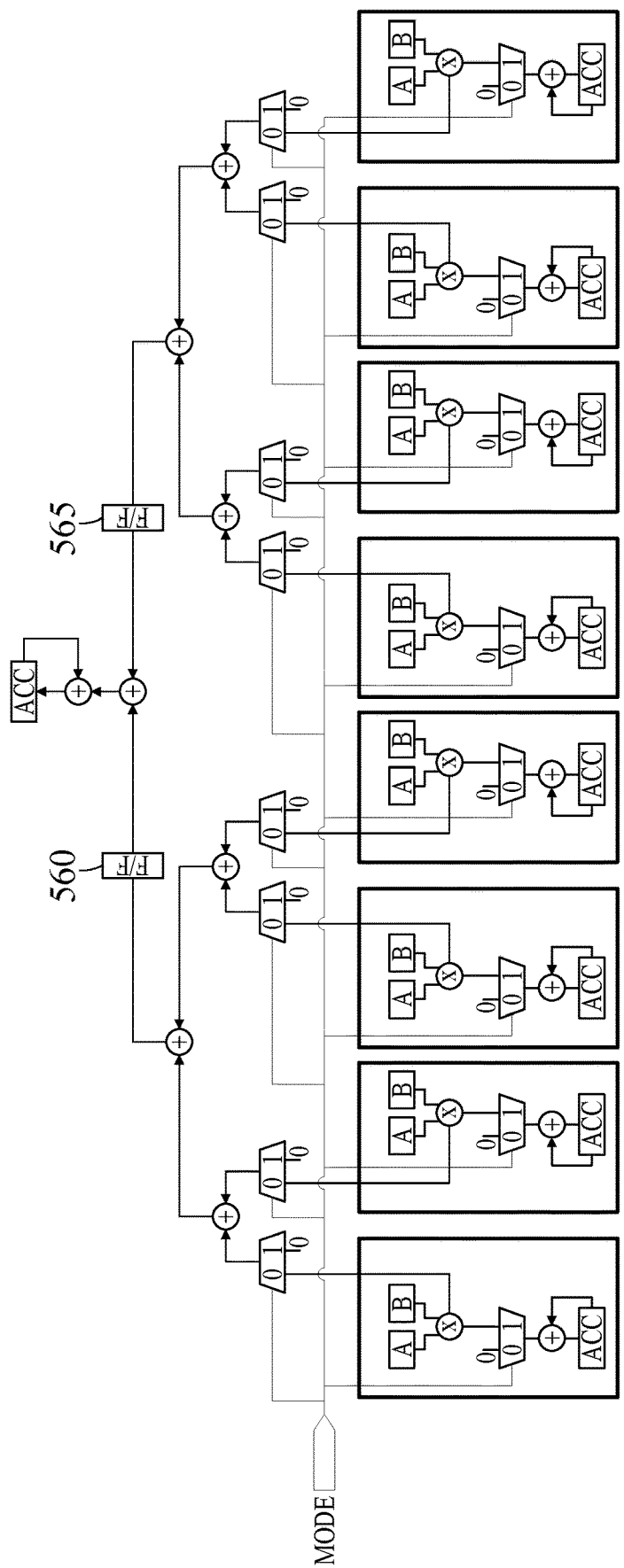

FIGS. 5A to 5C illustrate examples of apparatuses configured to perform deep learning operations.

When the apparatuses described with reference to FIGS. 4A to 4C operate in an adder tree mode, the distances from the PE 404 to the PEs 401 and 408 positioned at the edges may be relatively far, and thus the data path may pass through many adders and multiplexers. Thus, it may be difficult to achieve a high timing.

The apparatuses shown in FIGS. 5A to 5C may perform an adder tree mode operation at a high speed by separately designing an adder tree not to pass through a multiplexer.

For example, the apparatus of FIG. 5A may include a systolic array and an adder tree 520 configured to share multipliers of MAC units included in the systolic array.

For ease of description, an operation of a PE 510 among a plurality of PEs will be described. When a control signal "0" is input, an output of a multiplier 511 may be transferred to an adder 515 of the adder tree 520 through a second multiplexer 514, rather than being transferred to an adder 513 of the MAC unit through a first multiplexer 512. Through this, when the control signal "0" is input, the apparatus may operate in an adder tree mode.

If a control signal "1" is input, the output of the multiplier 511 may be transferred to the adder 513 of the MAC unit through the first multiplexer 512, and may not be transferred to the adder 515 of the adder tree 520 through the second multiplexer 514. Through this, when the control signal "1" is input, the apparatus may operate in a SIMD mode.

Referring to FIG. 5B, the apparatus may include a systolic array, and an adder tree 550 configured to share multipliers and accumulators of MAC units included in the systolic array.

For ease of description, an operation of a PE 530 among a plurality of PEs will be described. When a control signal "0" is input, an output of a multiplier 531 may be transferred to an adder 535 of the adder tree 550 through a second multiplexer 534, rather than being transferred to an adder 533 of the MAC unit through a first multiplexer 532. The final output of the adder tree 550 may be transferred to an accumulator 542 of the MAC unit through the first multiplexer 541 of the PE 540. Through this, when the control signal "0" is input, the apparatus may operate in an adder tree mode.

If a control signal "1" is input, the output of the multiplier 531 may be transferred to the adder 533 of the MAC unit through the first multiplexer 532, and may not be transferred to the adder 535 of the adder tree 550 through the second multiplexer 534. Through this, when the control signal "1" is input, the apparatus may operate in a SIMD mode.

Referring to FIG. 5C, the apparatus may have a structure of an adder tree further including flip-flops 560 and 565. The flip-flops 560 and 565 may be disposed between multipliers included in the systolic array and an accumulator for the adder tree. The apparatus may configure a synchronous circuit by adding the flip-flops 560 and 565, thereby increasing an operating frequency in an adder tree mode. A flip-flop continuously outputs information input at an edge (for example, a rising edge or a falling edge) of a clock signal until an edge of a subsequent clock signal. When the same clock signal is applied to the flip-flops, the apparatus may operate in synchronization with the clock signal. A synchronous circuit is generally robust against a transfer delay or a circuit delay when compared to an asynchronous circuit and thus, may operate at a higher operating frequency.

Figure 6A:
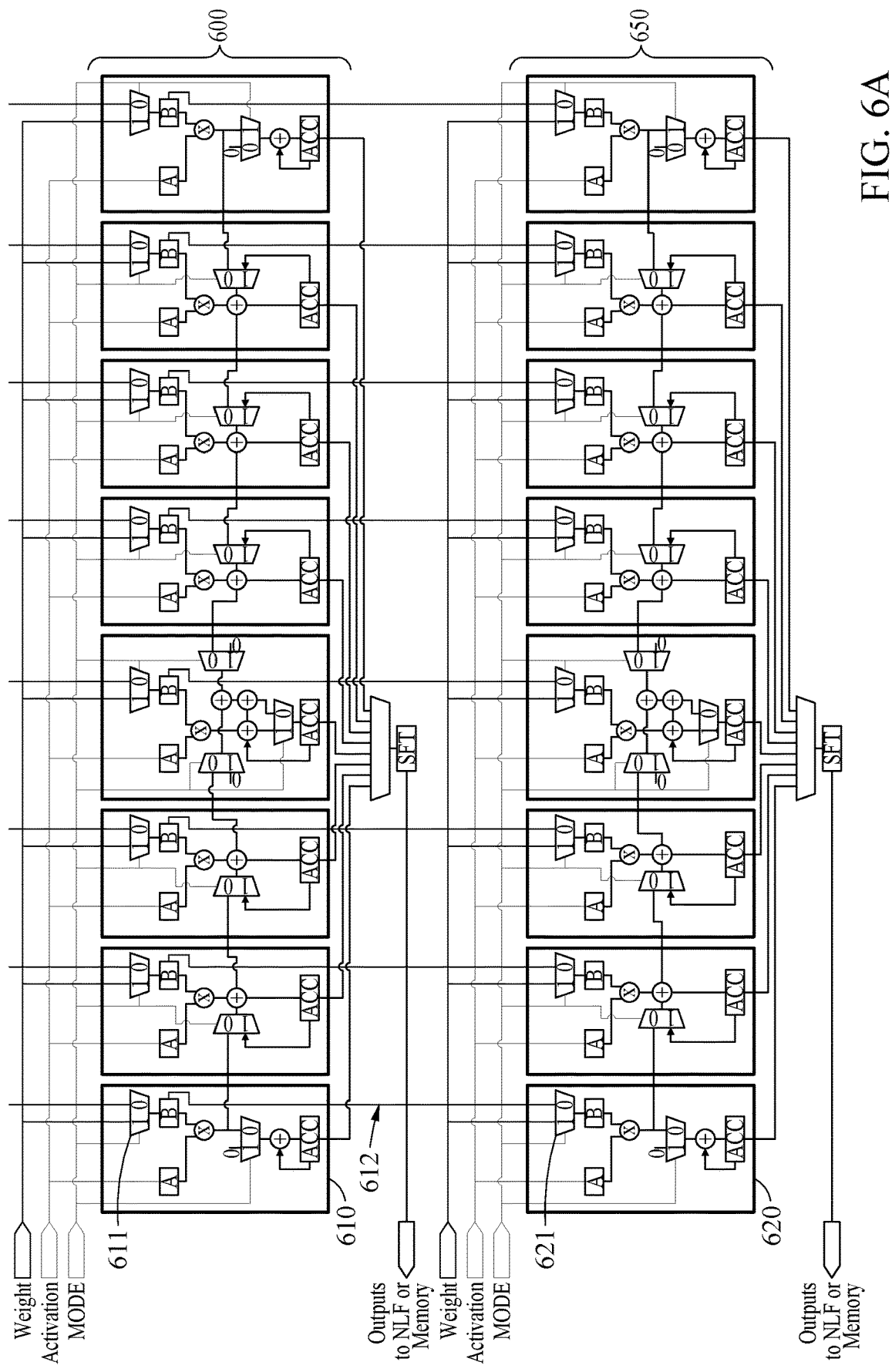
FIGS. 6A and 6B illustrate examples of apparatuses, configured to perform deep learning operations, with a systolic adder tree mode and a SIMD mode.
Figure 6B:
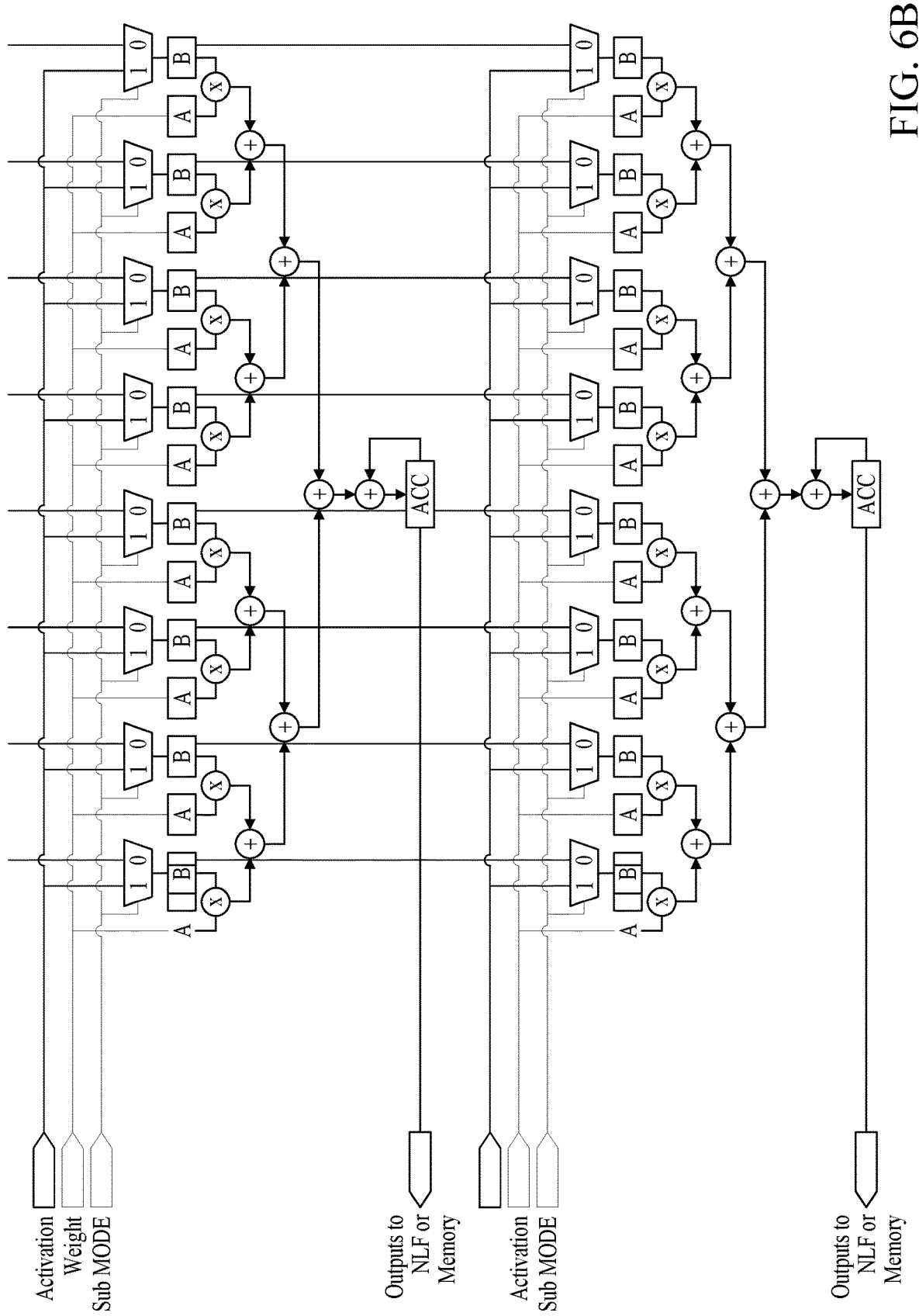

FIGS. 6A and 6B illustrate an example of an apparatus, configured to perform deep learning operations, with a systolic adder tree mode and a SIMD mode. The description of FIGS. 1 to 5C is also applicable to the following drawings, and thus a duplicated description will be omitted.

Referring to FIG. 6A, an apparatus may selectively operate in a systolic adder tree mode or a SIMD mode. For example, the apparatus may operate in the systolic adder tree mode when a control signal "0" is input and operate in the SIMD mode when a control signal "1" is input.

The apparatus shown in FIG. 6A further includes a predetermined configuration based on the apparatus shown in FIG. 4A and may provide a systolic adder tree mode through the additional configuration. A control circuit may thus further include a plurality of multiplexers 611 and 621 and data paths 612 to transfer input data of an upper-end systolic array 600 to a lower-end systolic array 650 as operating in the systolic adder tree mode. The control circuit may control operations of accumulators of MAC units included in the systolic array and data movements between the MAC units in respective responses to a plurality of operation modes. For example, the control circuit may control the operations of the MAC units so as to operate only an accumulator of one of the MAC units included in the systolic array in response to a systolic adder tree mode. Further, the apparatus may multiplex outputs of accumulators and output the multiplexed outputs through a shift register (SFT). Through this structure, the number of output ports may be reduced.

The systolic adder tree mode may perform the same operation as an adder tree mode, but differs in a data input method. In the systolic adder tree mode, the systolic array is arranged in the form of a 2D array, such that input data (for example, weights) of the upper-end systolic array may be transferred to the lower-end systolic array along respective columns of the arranged PE units, e.g., using the respective data paths 112. For ease of description, PEs 610 and 620 among a plurality of PEs will be described. The PE 620 may further include a multiplexer 621 compared to the PE 401 of FIG. 4A. When the control signal "0" is input, input data B of the PE 610 are shared or transferred to the PE 620 through the data path 612, and the multiplexer 621 may apply the input data B received through the data path 612 to a multiplier of the PE 620. The PEs other than the PEs 610 and 620 may also operate as described above.

For example, it may be understood that in the systolic adder tree mode, the apparatus may operate as in the structure of FIG. 6B. Referring to FIG. 6B, it may be learned that input data of the upper-end systolic array 600 are transferred to the lower-end systolic array 650 when a control signal "0" is input.

Conversely, when a control signal "1" is input, the multiplexer 621 of the PE 620 may select separate input data (e.g., other weights) rather than selecting the input data (the same weights) received through the data path 612 as an input, and thus the input data B of the PE 610 may not be transferred to the PE 620. Accordingly, when the control signal "1" is input, the apparatus may operate in a SIMD mode in which data are not moved between systolic arrays. The PEs other than the PEs 610 and 620 may also operate as described above.

Figure 7A:
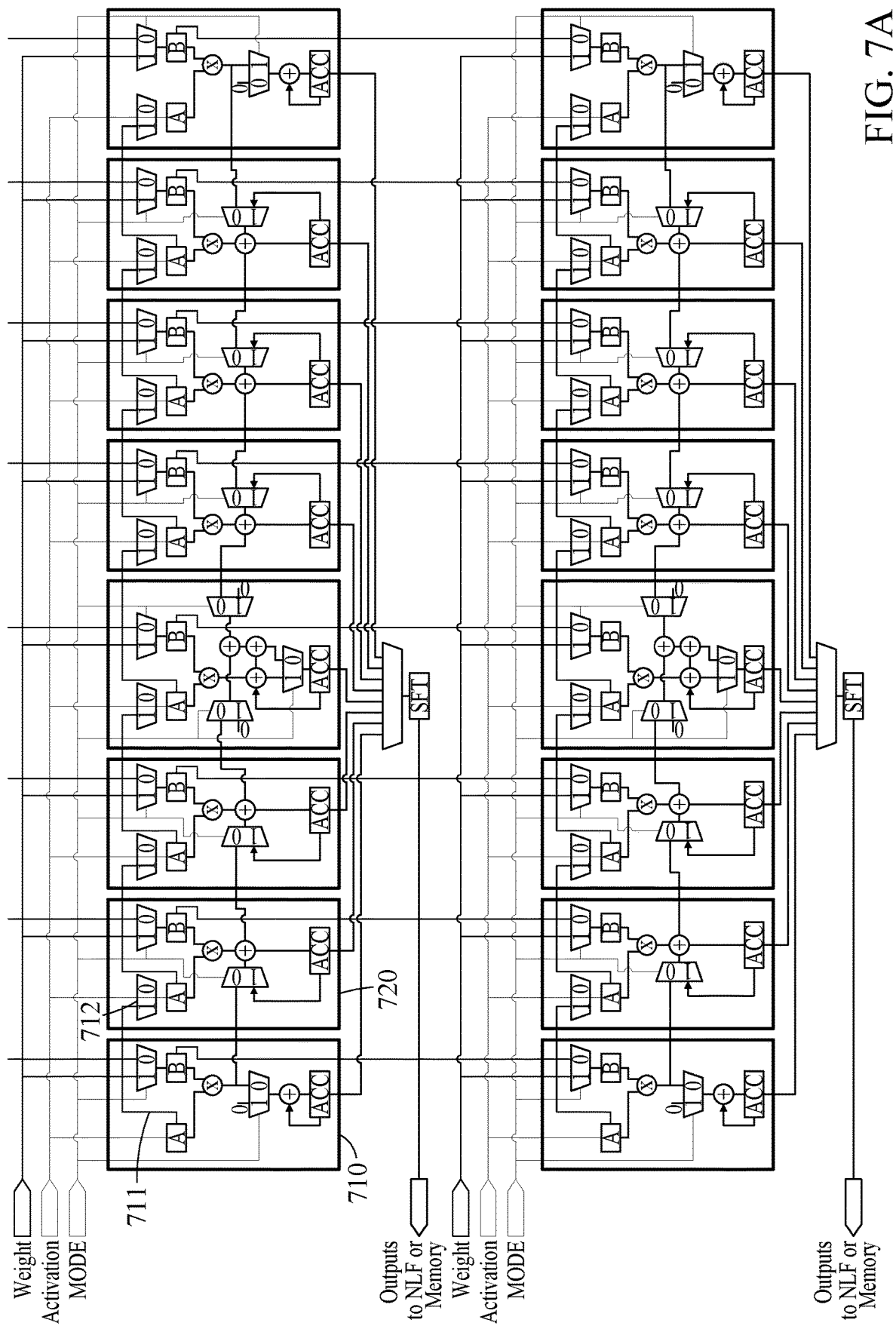
FIGS. 7A and 7B illustrate examples of apparatuses, configured to perform deep learning operations, with a systolic adder tree mode and a systolic mode.
Figure 7B:
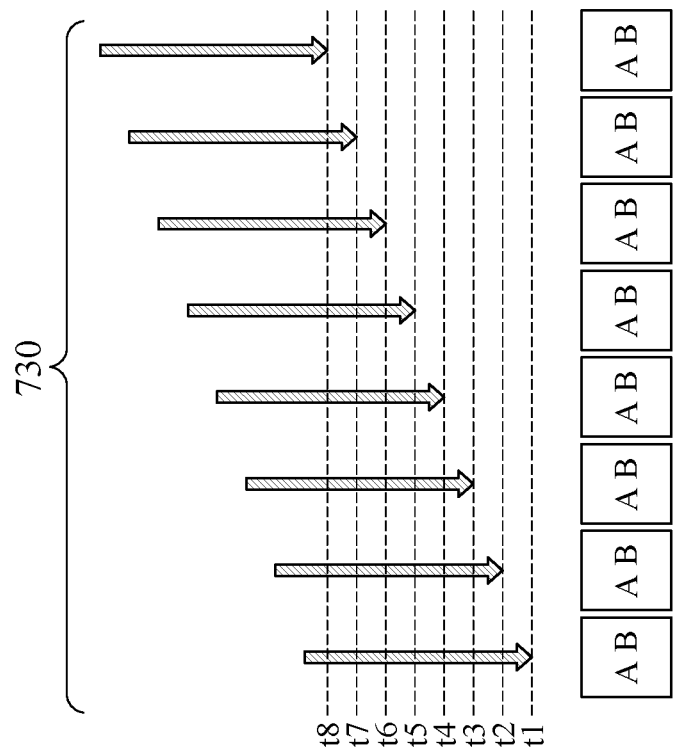
Figure 7B:
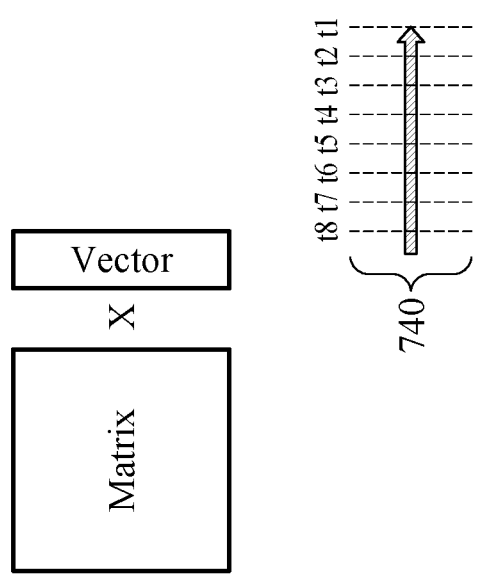

FIGS. 7A and 7B illustrate an example of an apparatus, configured to perform deep learning operations, with a systolic adder tree mode and a systolic mode. The description of FIGS. 1 to 6B is also applicable to the following drawings, and thus a duplicated description will be omitted.

The apparatus of FIG. 7A may selectively operate in a systolic adder tree mode or a systolic mode. For example, the apparatus may operate in the systolic adder tree mode when a control signal "0" is input and operate in the systolic mode when a control signal "1" is input.

The apparatus shown in FIG. 7A further includes a predetermined configuration based on the apparatus shown in FIG. 6A and may provide a systolic mode through an additional configuration, e.g., rather than the SIMD mode of FIG. 6A. For example, the control circuit may further include a plurality of multiplexers and data paths to transfer input data of a systolic array in the illustrated row direction as operating in the systolic mode.

The control circuit may control operations of accumulators of MAC units included in the systolic array and data movements between the MAC units in select response to a plurality of operation modes. For example, the control circuit may control the operations of the MAC units so as to operate accumulators of all the MAC units included in the systolic array in response to the systolic mode. Further, the apparatus may multiplex outputs of accumulators and output the multiplexed outputs through an SFT. Through this structure, the number of output ports may be reduced.

The systolic mode of FIG. 7A differs from a SIMD mode of FIG. 6A in a data input method. In the systolic mode, the input data of the systolic array may be transferred to the MAC units along rows and/or columns. For example, when the systolic array is arranged in the form of a 2D array, first input data (for example, weights) may be transferred from the upper-end systolic array to the lower-end systolic array along the columns, and second input data (for example, data values of an input feature map) may be transferred to neighboring MAC units of each of the upper-end and lower-end systolic arrays along the rows. For ease of description, PEs 710 and 720 among a plurality of PEs will be described. The PE 720 may further include a multiplexer 712 compared to the PE 610 of FIG. 6A. When the control signal "1" is input, input data A of the PE 710 are shared or transferred to the PE 720 through the data path 711, and the multiplexer 712 may apply the input data A received through the data path 711 as an input of the multiplier of PE 720. The PEs other than the PEs 710 and 720 may also operate as described above.

Referring to FIG. 7B, the apparatus may perform a matrix-vector multiply operation using the systolic mode. For example, in the systolic mode, the MAC units may respectively receive matrix data 730 at shown timings (for example, t1 to t8) through input terminals B. In addition, the control circuit may control vector data 740 to be transferred to neighboring MAC units of each of the upper-end and lower-end systolic arrays along their respective rows at shown timings (for example, t1 to t8) in response to the systolic mode. Through this, the MAC units may respectively receive the vector data at the shown timings (for example, t1 to t8) through input terminals A.

The control circuit may control operations of the MAC units so as to operate accumulators of all the MAC units included in the systolic array in response to the systolic mode. Through this, the MAC units may respectively perform matrix-vector multiply operations by accumulating the product of corresponding matrix data 730 and vector data 740 each time.

Figure 8:
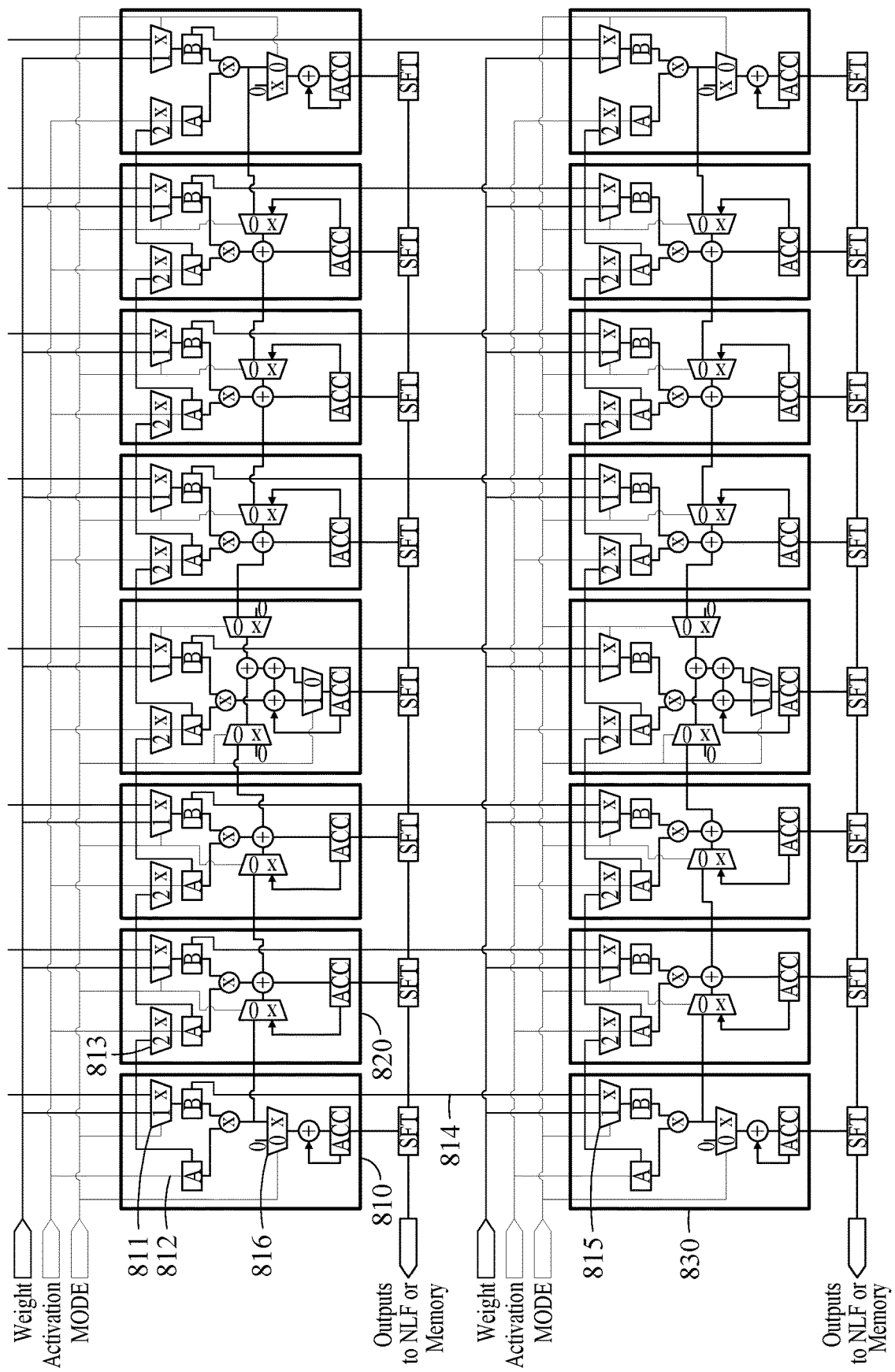
FIG. 8 illustrates an example of an apparatus, configured to perform deep learning operations, with a systolic adder tree mode, a SIMD mode, and a systolic mode.

FIG. 8 illustrates an example of an apparatus, configured to perform deep learning operations, with a systolic adder tree mode, a SIMD mode, and a systolic mode. The description of FIGS. 1 to 7B is also applicable to the following drawings, and thus a duplicated description will be omitted.

The apparatus of FIG. 8 may operate in a select one of a systolic adder tree mode, a SIMD mode, and a systolic mode. For example, the apparatus may operate in the systolic adder tree mode when a control signal "0" is input, operate in the SIMD mode when a control signal "1" is input, and operate in the systolic mode when a control signal "2" is input.

For ease of description, PEs 810, 820, and 830 among a plurality of PEs will be described. For example, as demonstrated in FIG. 8, the control signal may be input to multiplexers 811 and 816 of PE 810, multiplexer 813 of PE 820, and multiplexer 815 of PE 830.

When the control signal "0" is input, input data entering through an input terminal B of the PE 810 may be shared or transferred to the PE 830 through a data path 814, with the multiplexer 815 of the PE 830 selecting (according to the control signal "0") the input data received through the data path 814 as an input of an input terminal B of the PE 830. Also when the control signal "0" is input, the multiplexer 816 of the PE 810 may not share or transfer an output of the multiplier of the PE 810 to the adder of the PE 810 and thus, may not operate in the systolic mode. Therefore, when the control signal "0" is input, the apparatus may operate in the systolic adder tree mode in which input data (for example, weights) of an upper-end systolic array are transferred to a lower-end systolic array along columns. The PEs other than the PEs 810 and 830 may also operate as described above.

When the control signal "2" is input, the input data entering through an input terminal A of the PE 810 are shared or transferred to the PE 820 through a data path 812, with the multiplexer 813 of the PE 820 selecting (according to the control signal "2") to select the input data received through the data path 812 as an input of an input terminal A of the PE 820. Accordingly, the apparatus may operate in the systolic mode when the control signal "2" is input.

Conversely, when the control signal "1" is input, the multiplexer 813 of the PE 820 may select separate input data for the input terminal A of the PE 820, rather than selecting the input data received through the data path 812 as an input, and thus the input data of the input terminal A of the PE 810 may not be transferred to be the input data of the input terminal A of the PE 820. Accordingly, when the control signal "1" is input, the apparatus may operate in the SIMD mode in which data are not moved between systolic arrays. The PEs other than the PEs 810 and 820 may also operate as described above.

Figure 9A:
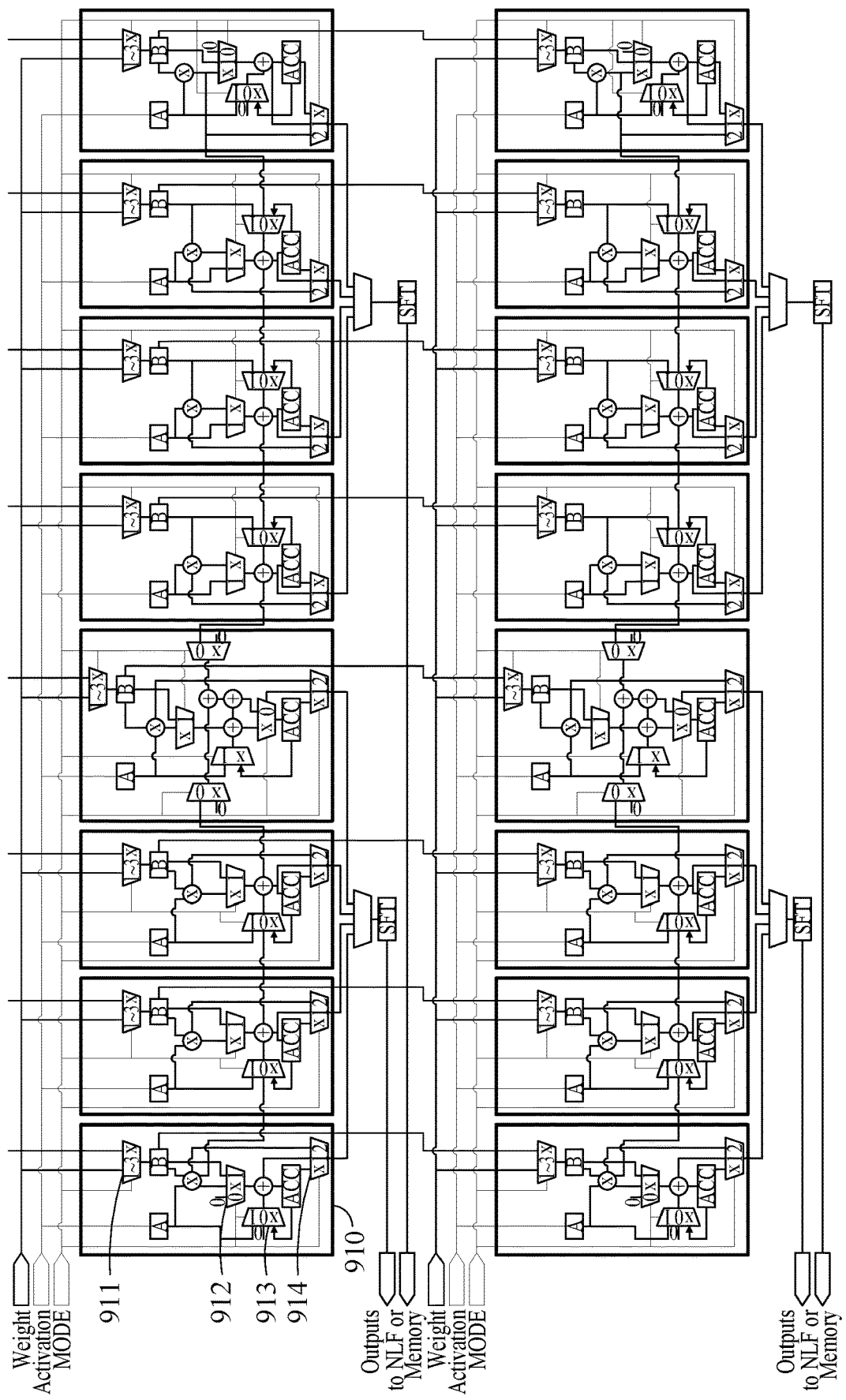
FIGS. 9A and 9B illustrate examples of apparatuses, configured to perform deep learning operations, with a systolic adder tree mode and a plurality of SIMD modes.
Figure 9B:
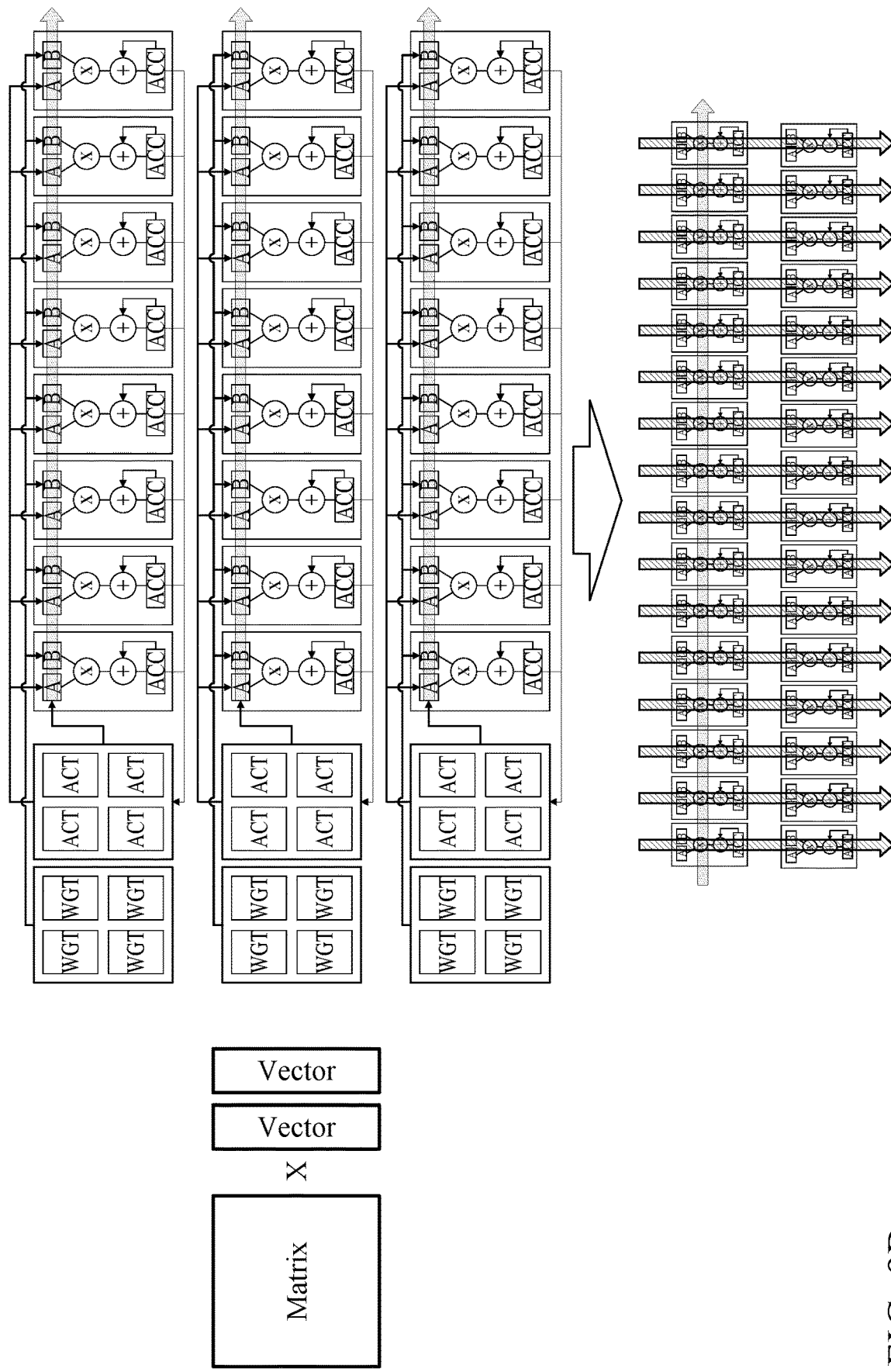

FIGS. 9A and 9B illustrate an example of an apparatus, configured to perform deep learning operations, with a systolic adder tree mode and a plurality of SIMD modes. The description of FIGS. 1 to 8 is also applicable to the following drawings, and thus a duplicated description will be omitted.

The apparatus of FIG. 9A may operate in one of a systolic adder tree mode and a plurality of SIMD modes. For example, the apparatus may operate in the systolic adder tree mode when a control signal "0" is input, operate in a SIMD mode to perform an elementwise add operation when a control signal "1" is input, operate in a SIMD mode to perform a matrix-vector multiply operation when a control signal "2" is input, and operate in a SIMD mode to perform a depth-wise convolution operation when a control signal "3" is input.

The apparatus shown in FIG. 9A further includes a predetermined configuration based on the apparatus shown in FIG. 6A and may provide a plurality of SIMD modes, rather than a single SIMD mode, through the additional configuration.

When the control signal "2" is input, the apparatus may perform the matrix-vector multiply operation as shown in FIG. 9B. The apparatus may also be suitable for a recurrent neural network (RNN) where matrix-vector operations are frequently used, and may process data while minimizing time delay even when the batch size increases.

Referring to FIG. 9A, a multiplexer 911 may output a select one of a weight and a weight received from a systolic array of another row based on the control signal. In response to the control signal, a multiplexer 912 may selectively output one of "0", an output of the multiplier of the PE 910, and input data received through an input terminal B of the PE 910. The multiplexer 912 may operate to perform an elementwise add operation of the input data by outputting the input data received through the input terminal B of the PE 910 to the adder of the PE 910. In response to the control signal, a multiplexer 913 may selectively output one of input data received through the input terminal A of PE 910, a "0", and an output of the accumulator (ACC) of the PE 910. In response to the control signal, a multiplexer 914 may selectively output one of the output of the ACC of the PE 910, the output of the adder of the PE 910, and the output of the multiplier of the PE 910.

FIG. 10 illustrates an example of an apparatus, configured to perform deep learning operations, with a systolic adder tree mode, a plurality of SIMD modes, and a systolic mode. The description of FIGS. 1 to 9B is also applicable to the following drawings, and thus a duplicated description will be omitted.

The apparatus of FIG. 10 may operate in a select one of a systolic adder tree mode, a plurality of SIMD modes, and a systolic mode. For example, the apparatus may operate in the systolic adder tree mode when a control signal "0" is input, operate in a SIMD mode to perform an elementwise add operation when a control signal "1" is input, operate in a SIMD mode to perform a matrix-vector multiply operation when a control signal "2" is input, operate in a SIMD mode to perform a depth-wise convolution operation when a control signal "3" is input, and operate in a systolic mode when a control signal "4" is input.

The apparatus shown in FIG. 10 further includes a predetermined configuration based on the apparatus shown in FIG. 9A and may thus further provide a systolic mode through the additional configuration.

The apparatus may use multiplexers to reduce shift registers at an output. For example, in the element add operation mode and the matrix-vector multiply operation mode, one output may need to be extracted in one cycle. If a clock frequency applied to the shift registers is increased to N times a frequency applied to the MAC units, and N:1 multiplexers are used, one output may be moved in one cycle.

The systolic mode may be used for applications desiring input-stationary, weight-stationary, output-stationary, or various combinations thereof. When a depth-wise convolution operation is processed in the systolic mode, high MAC utilization may also be achieved.

The systolic adder tree mode may be driven with lower power compared to the systolic mode. In addition, the SIMD mode has higher MAC utilization compared to the systolic mode, and may achieve relatively high MAC utilization in a depth-wise convolution operation.

When the size of a filter (for example, width (w)*height (h)*the number of channels (c)) is larger than the horizontal/vertical length of MAC units, it may be effective to operate in the systolic mode. On the other hand, a time of h*w*c*2 may be consumed to move the output to the shift register, and thus it may not be as effective when the size of MAC units is relatively large. Accordingly, it may be effective for the apparatus shown in FIG. 10 to operate in the systolic mode at a first layer of a neural network. However, power efficiency may rather decrease at the remaining layers due to greater power consumption of the MAC array.

The apparatus shown in FIG. 9A may have better power efficiency than the apparatus shown in FIG. 10.

The apparatus shown in FIG. 9A may have a relatively high overall processing rate since the MAC units may process elementwise add and matrix-vector multiply operations. However, since the elementwise add operation may desire a higher bandwidth, a high clock frequency may be desired to extract an output, and thus, an example may be provided with an additional multiplexer inserted for the elementwise add operation. Accordingly, the apparatus shown in FIG. 9A may thus have increased power consumption due to the inserted multiplexer in such an additional example.

The apparatus shown in FIG. 7A may have better power efficiency than the apparatus shown in FIG. 9A since the configuration for providing a plurality of SIMD modes is not illustrated in the apparatus shown in FIG. 9A. The apparatus shown in FIG. 7A may receive input data differently for each MAC unit and thus, may have relatively higher MAC utilization compared to a pure adder tree structure. In addition, the apparatus shown in FIG. 7A may reduce the time for filling the MAC units with data compared to the systolic mode and thus, may have higher MAC utilization.

Figure 11A:
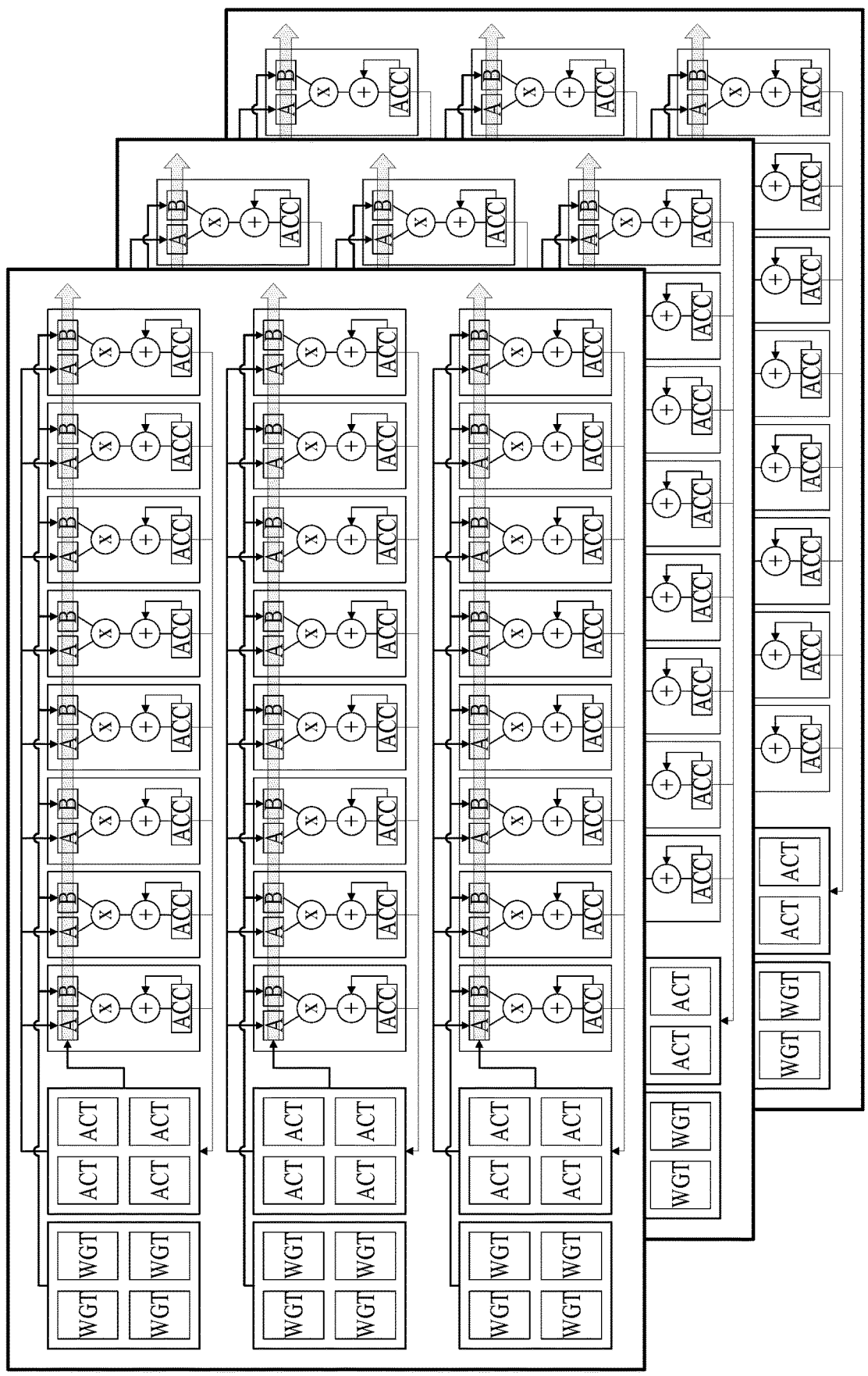
FIG. 11A illustrates an example of a systolic array arranged in the form of a three-dimensional (3D) array.
Figure 11B:
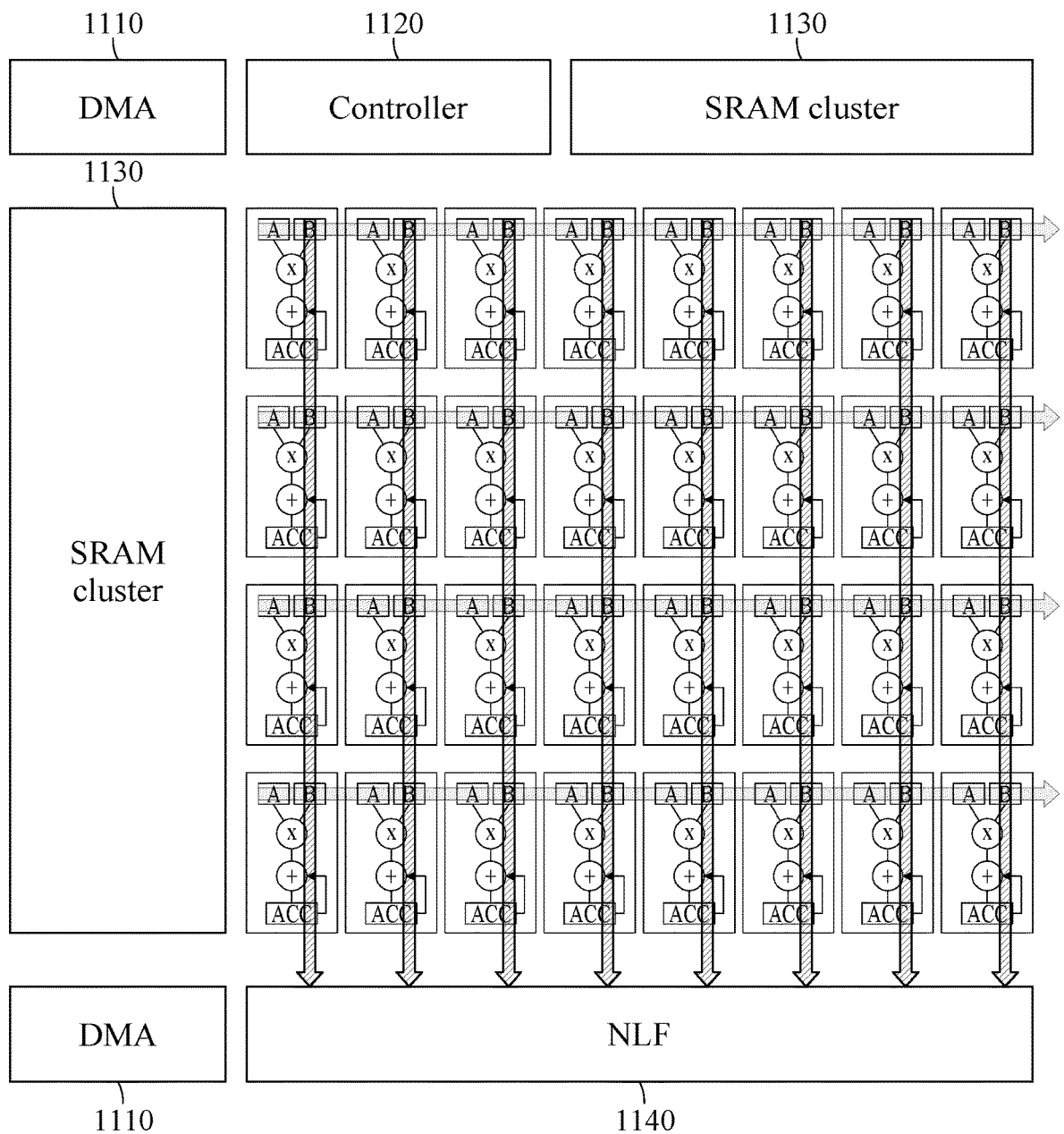
FIG. 11B illustrates an example of an apparatus configured to perform deep learning operations, as a convolution operation, a matrix-vector multiply operation, and a matrix-matrix multiply operation.

FIG. 11A illustrates an example of a systolic array arranged in the form of a three-dimensional (3D) array, and FIG. 11B illustrates an example of an apparatus configured to perform deep learning operations, as a convolution operation, a matrix-vector multiply operation, and a matrix-matrix multiply operation, for example. In FIGS. 11A and 11B, locations of an input feature map (or Activation, ACT, IFM) memory and a weight memory may vary in different examples.

The apparatus of FIG. 11A may improve processing rates of a convolution operation, a matrix-vector multiply operation, and a matrix-matrix multiply operation by arranging a systolic array in the example 3D form.

The apparatus of FIG. 11B may further include a direct memory access (DMA) 1110, a controller 1120, an SRAM cluster 1130, and a normalized lattice filter (NLF) 1140, for example. The apparatus may apply data to a desired row or column using a device capable of moving data such as the DMA 1110 or a central processing unit (CPU), and read output results. The processor of FIG. 11C below may be an example of the CPU. Furthermore, the apparatus may connect outputs of two or more rows or columns to add or accumulate result values of several rows or columns.

Figure 11C:
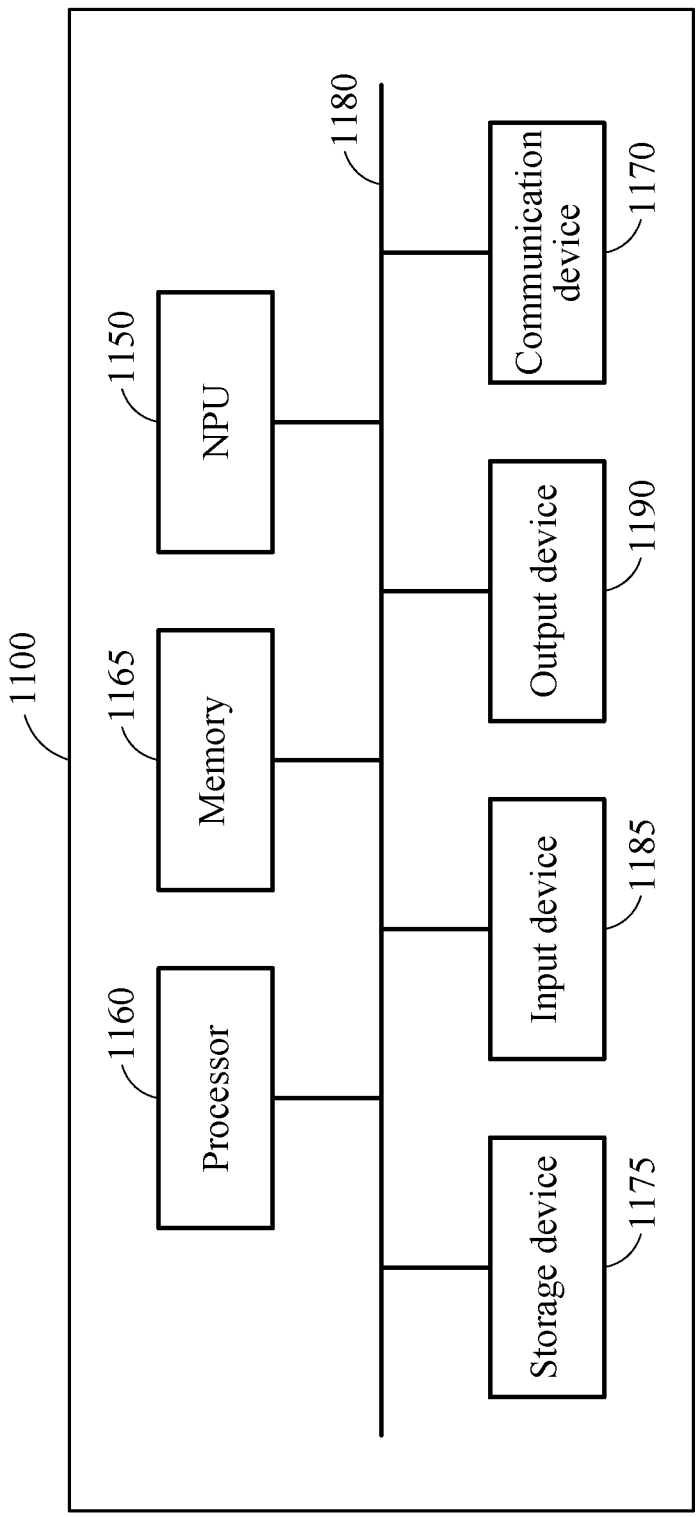
FIG. 11C is a diagram illustrating an example electronic apparatus.

FIG. 11C is a diagram illustrating an example electronic apparatus. Herein, any of the apparatuses of FIGS. 1A to 11C may also be referred to as a deep learning apparatus or devices, with respective configurations for deep learning capabilities, of training and/or inference operations.

An electronic apparatus 1100 may be representative of any, any combination, or all of the apparatuses, configured for deep learning operations, described above with respect to FIG. 1A through FIG. 11B. In another example, a neural processor 1150 of FIG. 11C may represent any, any combination, or all of the apparatuses described above with respect to FIG. 1A through FIG. 11B. As non-limiting examples, the electronic apparatus 1100 may be any of a data center, a server, a personal computer, a laptop computer, a tablet computer, a smart phone, a television, a smart home appliance, an intelligent vehicle, a kiosk, or a wearable device, in various respective examples.

Referring to FIG. 11, the electronic apparatus 1100 may include a processor 1160, the neural processor unit (NPU) 1150, a memory 1165, a communication device 1170, a storage device 1175, a communication bus 1180, an input device 1185, and an output device 1190.

The processor 1160 may control an overall operation of the electronic apparatus 1100, and execute functions and instructions in the electronic apparatus 1100. For example, the processor 1160 may be or include a CPU. The processor 1160 may be configured to interact with the NPU 1150 to perform one or more operations or methods described above with reference to FIGS. 1 through 11B, for example. In an example, the NPU 1150 may be configured to perform one or more, or all, of the operations or methods described above with reference to FIGS. 1 through 11B based on input/activation information from the processor 1160 and kernel weights from the memory 1165, as a non-limiting example. Another example exists without the NPU 1150, and the processor 1160 may correspond to the processors or apparatuses described herein and be configured to perform one or more operations or methods described above with reference to FIGS. 1 through 11B, for example.

The memory 1165 may store information for the processor 1160 and/or the NPU 1150 to perform various training or trained operational objectives, i.e., the deep learning operations described herein refer to examples of inference operations using trained weights and/or examples of training operations that generate one or more or all of the trained weights through iterative operation. The memory 1165 may also store instructions to be executed by the processor 1160 and/or NPU 1150, and store related information during the execution of software or an application in the electronic apparatus 1100. The memory 1165 may include, for example, a random-access memory (RAM), a dynamic RAM (DRAM), a static RAM (SRAM), or other types of nonvolatile memory that are well-known in the related technical field.

The storage device 1175 may include a computer-readable storage medium or a computer-readable storage device. The storage device 1175 may store a greater amount of information for a longer period of time compared to the memory 1165. The storage device 1175 may include, for example, a magnetic hard disk, an optical disc, a flash memory, a floppy disk, an electrically erasable programmable read-only memory (EEPROM), and other types of nonvolatile memory that are well-known in the related technical field.

The input device 1185 may receive an input from a user, for example. The input device 1185 may include, for example, a keyboard, a mouse, a touchscreen, a camera, a microphone, and other devices that may detect the input from the user.

The output device 1190 may provide an output of the electronic apparatus 1100, e.g., to a user through a visual, auditory, or tactile channel based on output of any of the apparatuses described herein with respect to FIGS. 1A to 11B. The output device 1190 may include a display, a touchscreen, a speaker, and other devices that may provide the output to the user.

The communication device 1170 may communicate with an external device through a wired or wireless network. The communication device 1170 may receive and transmit data or information from and to an external device. The communication bus 1180 may provide communication between such components of the electronic apparatus 1100.

The DMAs 1110, the controller 1120, the SRAM clusters 1130, the NLF 1140, processors, the PE units, the MAC units, accumulators, the multiplexers, the adders, the multipliers, the flip flops, the gates, the shift registers, timing clock, two-dimensional arrays, three-dimensional arrays, the electronic apparatus 1100, the processor 1160, the NPU 1150, the memory 1165, the storage device 1175, the communication device 1170, the communication bus 1180, the input device 1185, and the output device 1190, and other apparatuses, devices, units, modules, and components described herein with respect to FIGS. 1A through 11C are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller or unit, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A through 11C that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A deep learning apparatus, the apparatus comprising:
a processor, configured to support a plurality of different operation modes, comprising:
a systolic array comprising a plurality of multiplier accumulator (MAC) units; and
a control circuit configured to respectively control, for each the plurality of different operation modes, select operations of the plurality of MAC units and data movements among the plurality of MAC units.

2. The apparatus of claim 1, wherein the control circuit is configured to control operations of accumulators of multiple MAC units of the plurality of MAC units dependent on which operation mode, from among the plurality of different operation modes, is being implemented by the control circuit.

3. The apparatus of claim 1, wherein the plurality of different operation modes comprise any combination of two or more of an adder tree mode, a single instruction multiple data (SIMD) mode, a systolic adder tree mode, and a systolic mode.

4. The apparatus of claim 3, wherein the processor is configured to perform a depth-wise convolution operation in the SIMD mode.

5. The apparatus of claim 1, wherein the plurality of different operation modes include at least one of an adder tree mode and a systolic adder tree mode, and the control circuit is configured to operate an accumulator of only one MAC unit of a series of MAC units, of the plurality of MAC units, in response to the adder tree mode or the systolic adder tree mode being implemented by the control circuit.

6. The apparatus of claim 5, wherein the plurality of different operation modes further include at least one of a SIMD mode and a systolic mode, and the control circuit is configured to control an adder in the one MAC unit to not operate in response to the SIMD mode or the systolic mode being implemented by the control circuit.

7. The apparatus of claim 6, wherein the adder of one of MAC unit is configured to consider an adder output of a neighboring MAC unit in response to the adder tree mode or the systolic adder tree mode being implemented by the control circuit.

8. The apparatus of claim 5, wherein MAC units of the series of MAC units, other than the one MAC unit, each have only one adder, and the one MAC unit includes plural adders.

9. The apparatus of claim 1, wherein the plurality of different operation modes include at least one of a SIMD mode and a systolic mode, and the control circuit is configured to control an adder of one MAC unit of a series of MAC units, of the plurality of MAC units, to not operate and to control another adder of the one MAC unit and all respective adders of other MAC units of the series of MAC units to operate, in response to the SIMD mode or the systolic mode being implemented by the control circuit.

10. The apparatus of claim 9, wherein the plurality of different operation modes include another mode, and
the adder in the one MAC is configured to operate and to consider an adder output of a neighboring MAC unit, of the series of MAC units, in response to the other mode being implemented by the control circuit.

11. The apparatus of claim 1, wherein the plurality of different operation modes include at least one of a SIMD mode or a systolic mode, and the control circuit is configured to operate accumulators of all the plurality of MAC units in response to the SIMD mode or the systolic mode being implemented by the control circuit.

12. The apparatus of claim 1, wherein the plurality of different operation modes include at least one of an adder tree mode and a systolic adder tree mode, and
the control circuit is configured to control data movements of an operation result from one MAC unit to an adjacent MAC unit, for each of plural adjacent MAC units, in response to the adder tree mode or the systolic adder tree mode being implemented by the control circuit.

13. The apparatus of claim 12, wherein the data movements occur in both directions, from respective edge MAC units toward a MAC unit inward of the edge MAC units, wherein the inward MAC unit is configured to consider respective operation results from both of the directions.

14. The apparatus of claim 12, wherein the plurality of different operation modes further include another mode, and the control circuit is configured to not implement the data movements in response to the other mode being implemented by the control circuit.

15. The apparatus of claim 1, wherein the systolic array is configured with an arrangement of the plurality of MAC units in at least two rows of MAC units with at least one column of the at least two rows of MAC units, at least two columns of MAC units with at least one row of the at least two columns of MAC units, or two or more rows of MAC units with two or more columns of the two more rows of MAC units.

16. The apparatus of claim 15, wherein the plurality of different operation modes include at least one of a systolic mode and a systolic adder tree mode, and
the control circuit is configured to control the select data movements among the plurality of MAC units, to respectively transmit input data from a first MAC unit to a second MAC unit of row adjacent MAC units for each of one or more rows of the systolic array and/or respectively transmit other input data from a third MAC unit to a fourth MAC unit of columnar adjacent MAC units for each of one or more columns of the systolic array, in response to the systolic mode or the systolic adder tree mode being implemented by the control circuit.

17. The apparatus of claim 1, wherein the control circuit comprises a multiplexer disposed in at least one of the plurality of MAC units, where the multiplexer is configured to determine an input of an adder of the at least one MAC unit.

18. The apparatus of claim 1, wherein the control circuit comprises an adder tree circuit configured to receive respective outputs of multipliers of the plurality of MAC units.

19. The apparatus of claim 18, wherein the adder tree circuit comprises a flip-flop inserted between adders of the adder tree circuit.

20. The apparatus of claim 1, wherein each of the plurality of MAC units are configured in respective processing elements (PEs) arranged in the array,
where a first PE of the array includes a first respective portion of the control circuit and a first MAC unit having a first adder, a first multiplier, and a first accumulator,
a second PE of the array includes a second respective portion of the control circuit and a second MAC unit having a second adder, a second multiplier, and a second accumulator,
a third PE of the array includes a third respective portion of the control circuit and a third MAC unit having a third adder, a third multiplier, and a third accumulator.

21. The apparatus of claim 20, wherein the plurality of different operation modes comprise any combination of two or more of an adder tree mode, a single instruction multiple data (SIMD) mode, a systolic adder tree mode, and a systolic mode, and
the control circuit is configured to respectively control select operations of the first, second, and third MAC units, and control the first respective portion, the second respective portion, and the third respective portion to control select pipelining of inputs and/or outputs of the first, second, and third MAC units, depending on which of the plurality of different operation modes is indicated through a mode signal provided to the first PE, the second PE, and the third PE.

22. The apparatus of claim 21,
the first respective portion of the control circuit includes a first multiplexer configured to determine one of an output of the first accumulator or an output of a neighboring processing element to be an input of the first adder,
the second respective portion of the control circuit includes a second multiplexer configured to determine one of a predetermined value or an output of the second multiplier to be an input of the second adder, and
the third respective portion of the control circuit includes a third multiplexer configured to determine one of an output of the third adder or a sum of the output of the third adder and outputs of neighboring processing elements to be an input of the third accumulator.

23. The apparatus of claim 1, wherein the systolic array is configured to provide selective pipelining of inputs and/or outputs through multiple neighboring MAC unit among the plurality of MAC units dependent on the different operation modes.

24. A device, comprising:
an array of a plurality of processing elements,
wherein the plurality of processing elements include any one or any combination of:
a first processing element of the array, the first processing element comprising a first multiplexer configured to determine one of an output of an accumulator of the first processing element or an output of a neighboring processing element to be an input of an adder of the first processing element;
a second processing element of the array, the second processing element comprising a second multiplexer configured to determine one of a predetermined value or an output of a multiplier of the second processing element to be an input of an adder of the second processing element; and
a third processing element comprising a third multiplexer configured to determine one of an output of an adder of the third processing element or a sum of the output of the adder of the third processing element and outputs of neighboring processing elements to be an input of an accumulator of the third processing element.

25. The device of claim 24, wherein the device includes the first processing element, the second processing element, and the third processing element,
the first processing element includes the first multiplexer as a first portion of a control circuit of the device, and a first multiplier accumulator (MAC) unit having the adder of the first processing element, a multiplier of the first processing element, and the accumulator of the first processing element,
the second processing element includes the second multiplexer as a second portion of the control circuit, and a second MAC unit having the adder of the second processing element, the multiplier of the second processing element, and an accumulator of the second processing element,
a third processing element includes the third multiplexer as a third portion of the control circuit, and a third MAC unit having the adder of the third processing element, a multiplier of the third processing element, and the accumulator of the third processing element.

26. The device of claim 25, wherein the device configures into different operation modes of selective pipelining of inputs and/or outputs through neighboring MAC units dependent on corresponding operation mode specific operations of the first multiplexer, the second multiplexer, and the third multiplexer, and wherein the different operation modes include at least two of an adder tree mode, a single instruction multiple data (SIMD) mode, a systolic adder tree mode, and a systolic mode.

27. The device of claim 24, wherein,
in response to an adder tree mode of operation of the device,
the first multiplexer of the first processing element is configured to determine the output of the neighboring processing element to be the input of the adder of the first processing element,
the second multiplexer of the second processing element is configured to determine the output of the multiplier of the second processing element to be the input of the adder of the second processing element, and
the third multiplexer of the third processing element is configured to determine the sum of the output of the adder of the third processing element and the outputs of the neighboring processing elements to be the input of the accumulator of the third processing element.

28. The device of claim 27, wherein,
in response to the adder tree mode of operation of the device,
an accumulator of the second processing element and the accumulator of the third processing element do not operate.

29. The device of claim 24, wherein,
in response to a single instruction multiple data (SIMD) mode of operation of the device,
the first multiplexer of the first processing element is configured to determine the output of the accumulator of the first processing element to be the input of the adder of the first processing element,
the second multiplexer of the second processing element is configured to determine the predetermined value to be the input of the adder of the second processing element, and
the third multiplexer of the third processing element is configured to determine the output of the adder of the third processing element to be the input of the accumulator of the third processing element.

30. The device of claim 24, wherein the third processing element further comprises:
a fourth adder configured to add the outputs of the neighboring processing elements; and
a fifth adder configured to add the output of the adder of the third processing element and an output of the fourth adder.

31. The device of claim 30, wherein,
in response to a SIMD mode of operation of the device, the fourth adder and the fifth adder of the third processing element do not operate.

32. A deep learning method, the method comprising:
receiving input data;
receiving an indication of an operation mode; and
controlling operations of a plurality of multiplier accumulator (MAC) units, arranged in a systolic array, and data movements among the plurality of MAC units in response to the indicated operation mode.

33. The method of claim 32, wherein the controlling of operations of the plurality of MAC units and data movements among the plurality of MAC units includes controlling operations of two or more of the plurality of MAC units and/or data movements among the two or more of the plurality of MAC units in response to application of the received indication of the operation mode to control circuitry respectively arranged in the systolic array with respect to at least one of the two or more of the plurality of MAC units.

34. The method of claim 33, wherein the indicated operation mode is an operation mode among a plurality of different operation modes, and of any two or more of an adder tree mode, a single instruction multiple data (SIMD) mode, a systolic adder tree mode, and a systolic mode, and
wherein, with respect to different operation mode indications respectively for the plurality of different operation modes, each of the different operation mode indications respectively applied to one or more MAC units of the plurality of MAC units and/or control circuitry respective to each of at least one of the one or more MAC units, differently configures the systolic array with respect to selective use of all components of each of one or more of the plurality of MAC units and/or with respect to selective data movements among at least an adjacent pair of MAC units among the plurality of MAC units.

35. The method of claim 32, wherein the controlling of operations of the plurality of MAC units and data movements among the plurality of MAC units comprises controlling use of accumulators of the plurality of MAC units in response to the indicated operation mode.

36. The method of claim 35, wherein, in response to the indicated operation mode being a single instruction multiple data (SIMD) mode or a systolic mode, the controlling controls the operations of MAC units in a series of adjacent MAC units in the systolic array so as to operate accumulators of all the MAC units in the series of adjacent MAC units.

37. The method of claim 32, wherein, in response to the indicated operation mode being an adder tree mode or a systolic adder tree mode, the controlling controls operations of MAC units in a series of adjacent MAC units in the systolic array so as to use only one accumulator of one MAC unit among all accumulators of all of the MAC units in the series of adjacent MAC units.

38. The method of claim 37, wherein, in response to the indicated operation mode being a single instruction multiple data (SIMD) mode or a systolic mode, the controlling controls operations of the MAC units in the series of adjacent MAC units so that the one MAC unit does not operate an adder of the one MAC unit, wherein operation of the adder would implement of data movements to the one Mac unit from one or more other MAC units in the series of adjacent MAC units.

39. The method of claim 38, wherein, in response to the indicated operation mode being the SIMD mode or the systolic mode, the controlling controls the operations of the MAC units in the series of adjacent MAC units to operate accumulators of all the MAC units in the series of adjacent MAC units.

40. The method of claim 32, wherein, in response to the indicated operation mode being an adder tree mode or a systolic adder tree mode, the controlling controls data movements among MAC units in a series of adjacent MAC units in the systolic array so as to receive by one of the series of adjacent MAC units an operation result from one or more other MAC units of the series of adjacent MAC units.

41. The method of claim 32, wherein, in response to the indicated operation being a systolic mode or a systolic adder tree mode, the controlling
controls data movements between MAC units along a row of the systolic array so as respectively transmit first input data from one of the MAC units along the row to another one or more of the MAC units along the row, and/or controls data movements between MAC units along a column of the systolic array so as respectively transmit second input data from one of the MAC units along column to another one or more of the MAC units along the column.

42. A non-transitory computer-readable storage medium storing instructions that, when executed by a processor, cause the processor to perform the method of claim 32.

43. A deep learning apparatus, the apparatus comprising:
a processor, configured to support a plurality of different operation modes, comprising:
  a systolic array comprising a plurality of multiplier accumulator (MAC) units arranged in two dimensions of rows and columns, and configurable respective row input and/or output data communication paths among multiple MAC units for each of a plurality of the rows, and configurable respective column input and/or output data communication paths among multiple MAC units for each of a plurality of the columns; and
  a control circuitry, for the systolic array, configured to respectively reconfigure the systolic array to respectively operate differently in at least two of an adder tree mode, a single instruction multiple data (SIMD) mode, a systolic adder tree mode, and a systolic mode for input data.

44. The apparatus of claim 43, wherein the systolic array further comprises a plurality of MAC units arranged in a third dimension.

45. The apparatus of claim 43, wherein each of the plurality of MAC units is included in a corresponding respective processing element (PE) arranged in the two dimensions of columns and rows, and a plurality of the PEs each comprise control circuitry portions that, upon application of an operation mode signal,
  respectively control select use of components of each of respective MAC units of a multiple number of the plurality of PEs, and/or
  respectively control of which of the respective row input data communication paths and/or respective row output data communication paths are configured to be implemented and not implemented, and/or control of which of the respective column input data communications paths and/or respective column output data communication paths are configured to be implemented and not implemented.

46. The apparatus of claim 45, wherein, when the operation mode is the SIMD mode,
  the input data includes activation feature data respectively input to multiple rows of the plurality of rows and respectively communicated along each of the multiple rows using the implemented respective row input data communication paths,
  the input data includes neural network filter weights, respectively input to multiple columns of the plurality of columns and respectively communicated along each of the multiple columns using the implemented respective column input data communication paths, and
  output data of the systolic array is provided by respective summations for each of the multiple columns of the systolic array, each respective summation being a summation of multiplier results of one or more rows of processing elements for a corresponding column through the implemented respective column output data communications paths, as results of a depth-wise convolution of the activation feature data and the neural network filter weights.

* * * * *